US008001135B2

(12) United States Patent
Fume et al.

(10) Patent No.: US 8,001,135 B2
(45) Date of Patent: Aug. 16, 2011

(54) SEARCH SUPPORT APPARATUS, COMPUTER PROGRAM PRODUCT, AND SEARCH SUPPORT SYSTEM

(75) Inventors: Kosei Fume, Kanagawa (JP); Yasuto Ishitani, Kanagawa (JP); Masaru Suzuki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 406 days.

(21) Appl. No.: 12/038,573

(22) Filed: Feb. 27, 2008

(65) Prior Publication Data

US 2008/0215550 A1 Sep. 4, 2008

(30) Foreign Application Priority Data

Mar. 2, 2007 (JP) ................................. 2007-052843

(51) Int. Cl.
G06F 7/00 (2006.01)
G06F 17/30 (2006.01)
G06F 17/28 (2006.01)
(52) U.S. Cl. ............. 707/758; 707/710; 707/722; 704/4
(58) Field of Classification Search ........................ None
See application file for complete search history.

(56) References Cited

U.S. PATENT DOCUMENTS

| 6,401,061 | B1* | 6/2002 | Zieman .......................... 704/10 |
| 6,584,470 | B2* | 6/2003 | Veale ..................................... 1/1 |
| 7,487,095 | B2* | 2/2009 | Hill et al. ...................... 704/275 |
| 7,711,703 | B2* | 5/2010 | Smolen et al. ................ 709/201 |
| 2002/0154817 | A1* | 10/2002 | Katsuyama et al. .......... 382/190 |
| 2005/0187913 | A1* | 8/2005 | Nelken et al. ..................... 707/3 |
| 2006/0080276 | A1 | 4/2006 | Suzuki et al. |
| 2007/0130112 | A1* | 6/2007 | Lin .................................. 707/2 |
| 2008/0091706 | A1 | 4/2008 | Suzuki et al. |
| 2008/0243791 | A1 | 10/2008 | Suzuki et al. |
| 2009/0112836 | A1 | 4/2009 | Ishitani et al. |

FOREIGN PATENT DOCUMENTS

| JP | 2002-259427 | 9/2002 |
| JP | 2003-132060 | 5/2003 |
| JP | 2003-208434 | 7/2003 |

* cited by examiner

Primary Examiner — Susan Y Chen
(74) Attorney, Agent, or Firm — Turocy & Watson, LLP

(57) ABSTRACT

A search support apparatus estimates, based on a document and a specific phrase (keyword) in the document, a theme of the document, a site type of a website that provides the document, and a content type of the document, and selects a search condition corresponding to the theme, the site type, and the content type, to be presented to the user.

9 Claims, 24 Drawing Sheets

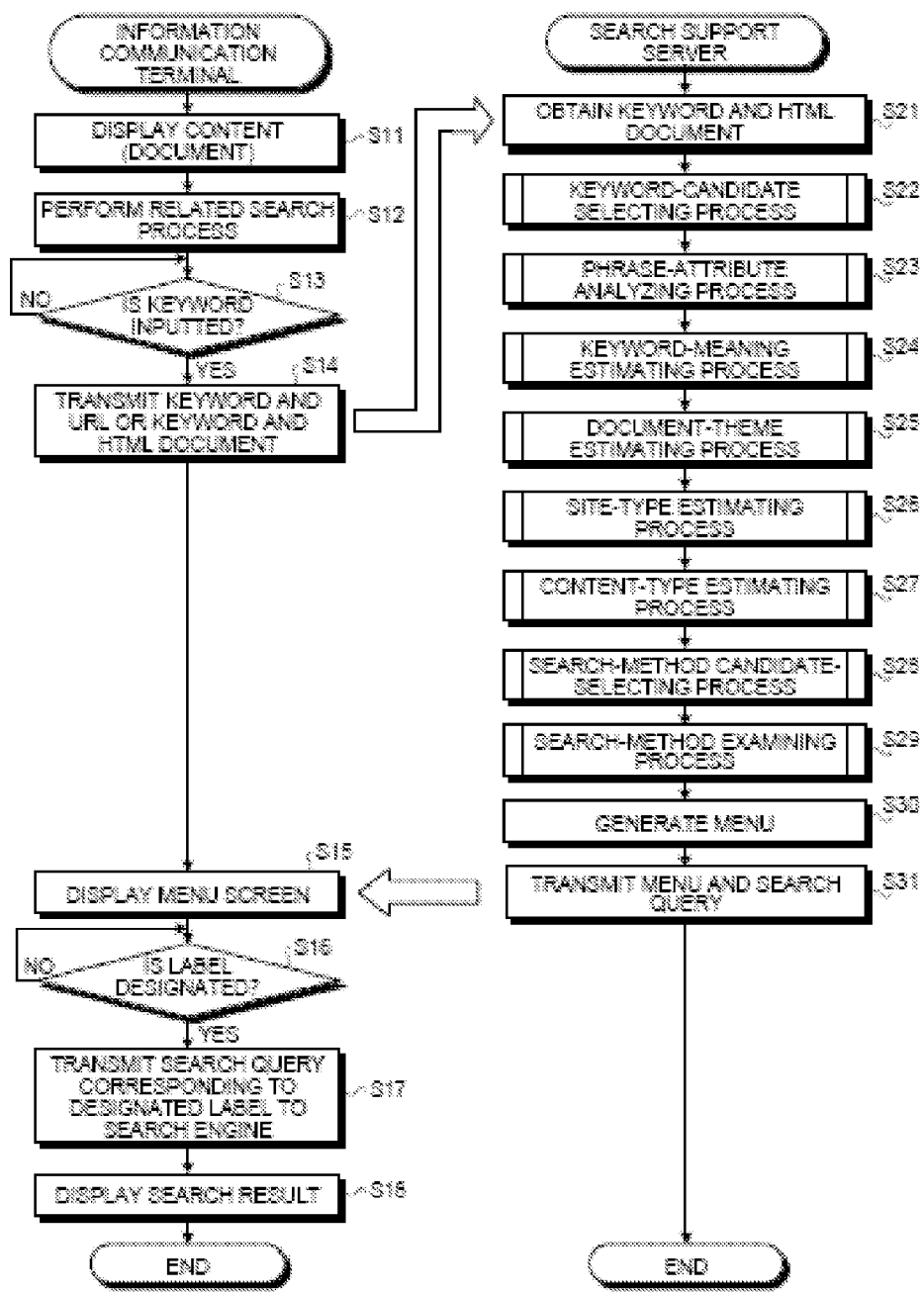

FIG.18A

```
ID    THEME      LABEL
100   COMPUTER   CHECK SPECS| CHECK TIMES TO RELEASE|
                 SEE REPUTATIONS
200   SPORTS     SEE MATCH RESULTS| SEE PROFILES
300   POLITICS   SEE PROFILES| CHECK MEANINGS| CHECK ORGANIZATIONS
400   TRAVEL     SEE MAPS| CHECK VALUES| SEARCH FOR TOURS
...
```

FIG.18B

```
ID    SITE TYPE       LABEL
010   SHOPPING SITE   CHECK PRICES| CHECK REPUTATIONS|
                      CHECK DEALERS
020   NEWS SITE       READ NEWS| SEE PROFILES| SEE PHOTOS
030   BLOG            SEE REPUTATIONS| SEE PROFILES
040   TRAVEL SITE     SEARCH FOR TOURS| SEE MAPS| CHECK PLACES|
                      SEE IMPRESSIONS
...
```

FIG.18C

```
ID    CONTENT TYPE    LABEL
010   CATALOG         CHECK MEANINGS OF TERMS| CHECK PRICES
020   REVIEW          CHECK SPECS| SEE REPUTATIONS
030   ARTICLE         READ NEWS| SEE PROFILES| CHECK PLACES
040   PRESS RELEASE   CHECK MEANINGS OF TERMS|
                      CHECK COMPANIES| CHECK PRICE
...
```

FIG.19

```
LABEL               ADDITIONAL QUERY
CHECK PRICES        VALUE| PRICE| NET SELLING PRICE| PRICE|
                    BARGAIN PRICE
FIND MATCH RESULTS  SCORE| MATCH RESULT| WIN| MARGIN
READ NEWS           NEWS| ARTICLE
SEE PROFILES        PROFILE| PROFILE| INTRODUCTION
SEE PHOTOS          IMAGE| IMAGE| JPG| JPEG
```

FIG.23

WITH REGARD TO "TANAKA"

1. SEE MATCH RESULTS    MOBILE SITE

2. SEE PHOTOS    MOBILE SITE

3. READ NEWS    MOBILE SITE

4. SEE PROFILES    MOBILE SITE

BACK TO PREVIOUS PAGE

FIG.24

Googoo

1. JAPAN LOST TO BRAZIL 1-4
TOSHIHIDE TANAKA, HAVING RECEIVED THE BALL IN THE CENTER, HIT A MIDDLE RANGE SHOT, BUT IT WAS STRAIGHT INTO THE GOALKEEPER ...

2. AUSTRALIA WON 3-1
NAKAMURA WHO WAS FREE ON THE RIGHT PROVIDED A CROSS, BUT IT WAS A LITTLE TOO DEEP. TOSHIHIDE TANAKA ... THE BALL ....

SEARCH SUPPORT APPARATUS, COMPUTER PROGRAM PRODUCT, AND SEARCH SUPPORT SYSTEM

CROSS-REFERENCE TO RELATED APPLICATIONS

This application is based upon and claims the benefit of priority from the prior Japanese Patent Application No. 2007-052843, filed on Mar. 2, 2007; the entire contents of which are incorporated herein by reference.

BACKGROUND OF THE INVENTION

1. Field of the Invention

The present invention relates to a search support apparatus, a computer program product, and a search support system that support search for websites.

2. Description of the Related Art

Recently, with the remarkable spread of mobile phones and increases in the performances resulting from technical innovations, the mobile phones are used not only for verbal communications but also generally used for transmission and reception of e-mails or browsing of sites for mobile phones. In some models, installation of a web browser enables browsing of common web contents. Accordingly, the mobile phones fulfill roles as high-performance information terminals like a personal computer (PC) or a personal digital assistance (PDA).

As the mobile phones expand the roles as the information terminals to access a larger amount of contents like the PC, it is required that desired information can be easily retrieved from the large amount of information to easily reach target information, even on a screen of a limited input interface of the mobile phone.

Against this background, there are two main typical methods of performing search using the mobile phone to reach a target site or information. One of the methods is a directory search method by which a target site is retrieved by navigating a hierarchical menu prepared by content service, and the other is a keyword search method by which a keyword is inputted to a search engine to obtain a summary list of search results, and the summary list is referred to reach target information.

Various techniques have been proposed with regard to the search method. For example, the specifications of Japanese Patent No. 3759700 disclose a technique of searching for pointer information for an entity to be searched using a phrase that describes a use purpose of a search target, to improve efficiency of search for information desired by the user. JP-A 2003-208434 (KOKAI) discloses a technique of extracting a keyword from a designated hypertext file and searching for a location at which a content is registered using the extracted keyword, thereby easily finding similar sites. JP-A 2003-132060 (KOKAI) discloses a technique of matching a search input sentence and a prepared example sentence, requesting a search engine related to the matched example sentence to search for a keyword extracted from the search input sentence, and presenting a search result to the user, thereby lessening a burden of the search engine selection.

However, according to the directory search method, when the granularity of classification (hierarchical category) previously defined is too fine, the amount of operation required to reach a target site is increased, which makes the operation complicated. When the granularity of the hierarchical category is coarse, the number of sites belonging to a specific category becomes large. Therefore, the amount of operation required to find the target site is increased again, which makes the operation complicated.

Meanwhile, according to the keyword search method, when many results are displayed in a list as the result of the search, a limited display area of the mobile phone requires a much screen scrolling operation, and thus the operability is low. When a search word is additionally inputted to restrict the search results, much manipulation must be performed using limited input means of the mobile phone, which makes the operation complicated.

Furthermore, in the technique as described in the specifications of Japanese Patent No. 3759700, various phrases expressing the user's preferences must be registered exhaustively to enhance the search accuracy, which is unrealistic and lacks in practicality. The operation at the generation of the phrases as the search conditions is complicated. According to the technique as described in JP-A 2003-208434 (KOKAI), no specific operation by the user is needed, while only sites similar to a site of the designated hypertext file can be retrieved. Therefore, a site desired by the user may not be presented. According to the technique as described in JP-A 2003-132060 (KOKAI), sites are uniquely classified into specific fields based on the prepared example sentences. Therefore, the flexibility is low, and the sites may not be classified into fields desired by the user.

SUMMARY OF THE INVENTION

According to one aspect of the present invention, a search support apparatus includes a document obtaining unit that obtains a document and a keyword that is a specific character string designated in the document; a statistical-information generating unit that extracts morphemes having a specific attribute among morphemes included in the document, and generates statistical information associated with statuses of appearance of the extracted morphemes in the document; a first storage unit that stores a morpheme attribute table relating morphemes to attributes of the morphemes; an attribute determining unit that determines attributes of the morphemes included in the document, based on the morpheme attribute table; a keyword-information generating unit that generates keyword information relating each of the morphemes included in the keyword to an attribute of the morpheme; a second storage unit that stores a theme table relating themes representing fields to terms associated with the themes; a third storage unit that stores a search condition table relating the themes representing the fields to search conditions associated with the themes; a theme estimating unit that estimates a theme of the document from the morphemes included in the statistical information and the keyword information, based on the theme table; and a search-condition selecting unit that selects a search condition associated with the estimated theme of the document, from the search condition table.

According to another aspect of the present invention, a computer program product having a computer readable medium including programmed instructions for supporting a search, wherein the instructions, when executed by a computer, cause the computer to perform: obtaining a document and a keyword that is a specific character string designated in the document; extracting morphemes having a specific attribute among morphemes included in the document, and generating statistical information associated with statuses of appearance of the extracted morphemes in the document; determining attributes of the morphemes included in the document, based on a morpheme attribute table relating morphemes to attributes of the morphemes; generating keyword information relating each of the morphemes included in the keyword to an attribute of the morpheme; estimating a theme of the document from the morphemes included in the statistical information and the keyword information, based on a theme table relating themes representing fields to terms associated with the themes; and selecting a search condition associated with the estimated theme of the document, from a search condition table relating the themes representing the fields to search conditions associated with the themes.

According to still another aspect of the present invention, a search support system includes an information communication terminal and a search support apparatus which are connected to communicate each other. The information communication terminal includes a content browsing unit that obtains a document provided by an external device; a keyword designating unit that can designate a specific character string in the document as a keyword; a browsing-resource transmitting unit that transmits the document and the keyword to the search support apparatus; and a display unit. The search support apparatus includes a document obtaining unit that obtains the document and the keyword; a statistical-information generating unit that extracts morphemes having a specific attribute among morphemes included in the document, and generates statistical information associated with statuses of appearance of the extracted morphemes in the document; a first storage unit that stores a morpheme attribute table relating morphemes to attributes of the morphemes; an attribute determining unit that determines attributes of the morphemes included in the document, based on the morpheme attribute table; a keyword-information generating unit that generates keyword information relating each of the morphemes included in the keyword to an attribute of the morpheme; a second storage unit that stores a theme table relating themes representing fields to terms associated with the themes; a third storage unit that stores a search condition table relating the themes representing the fields to search conditions associated with the themes; a theme estimating unit that estimates a theme of the document from the morphemes included in the statistical information and the keyword information, based on the theme table; and a search-condition selecting unit that selects a search condition associated with the estimated theme of the document, from the search condition table.

BRIEF DESCRIPTION OF THE DRAWINGS

FIG. 4 is a ladder chart of an operation of a browser-related search process;

FIGS. 18A to 18C are examples of a search method model;

FIG. 19 is still another example of the search method model;

FIG. 23 is an example of a screen displayed on the display unit of the information communication terminal;

FIG. 24 is another example of a screen displayed on the display unit of the information communication terminal;

DETAILED DESCRIPTION OF THE INVENTION

Exemplary embodiments of a search support apparatus, a computer program product, and a search support system according to the present invention will be explained below in detail with reference to the accompanying drawings.

Figure 1:
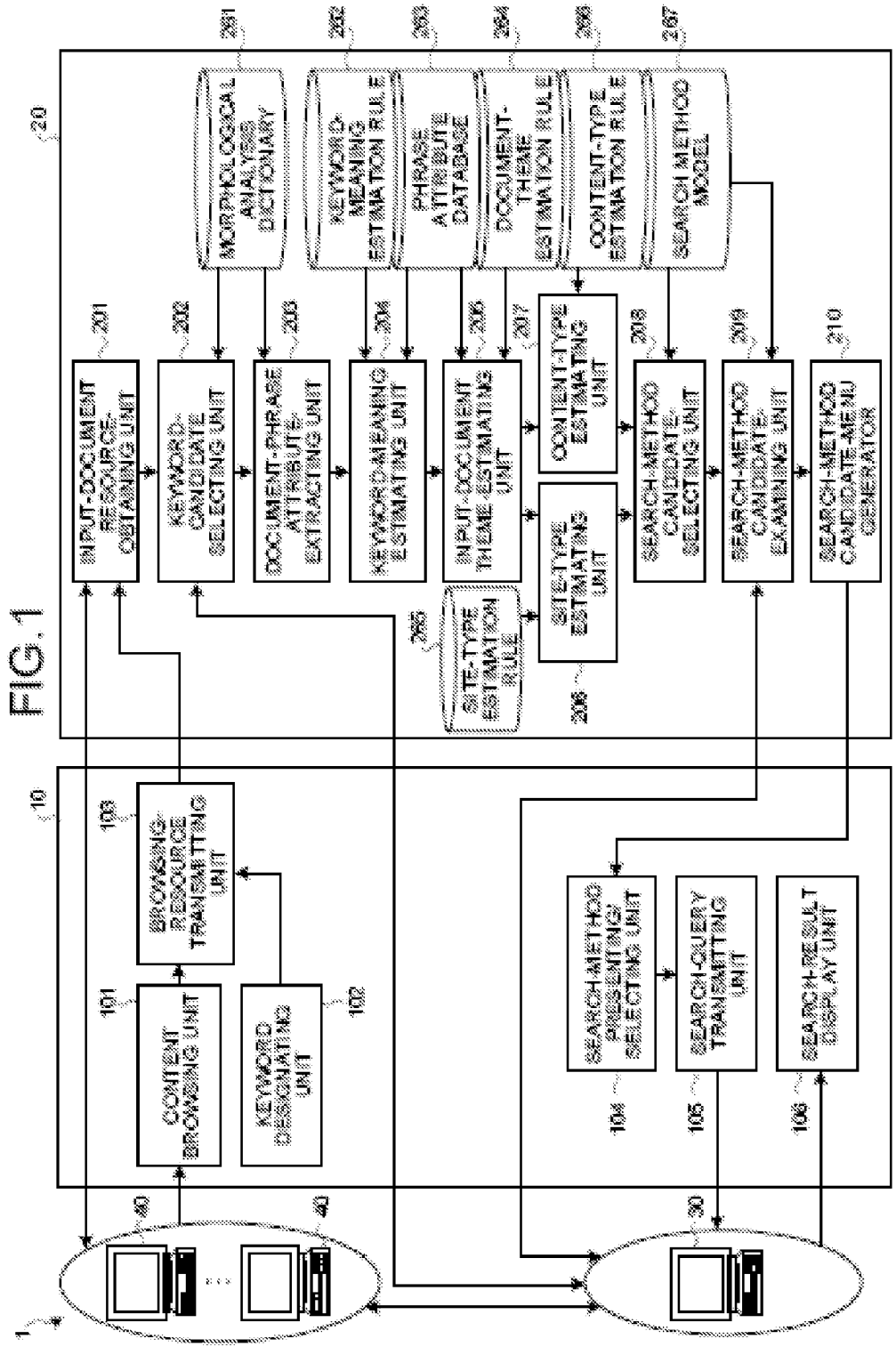
FIG. 1 is a schematic diagram of a configuration of a search support system according to a first embodiment of the present invention.

FIG. 1 is a schematic diagram of a configuration of a search support system 1 according to a first embodiment of the present invention. As shown in FIG. 1, the search support system 1 includes an information communication terminal 10, a search support server (search support apparatus) 20, a search engine 30, and web servers 40. These components are connected through a network such as the Internet to communicate each other.

The information communication terminal 10 is explained. The information communication terminal 10 is an information communication terminal device such as a mobile phone, and connects the network through a communicating unit 16 (which is explained later) to transmit or receive information to/from the search support server 20, the search engine 30, and the web servers 40.

Figure 2:
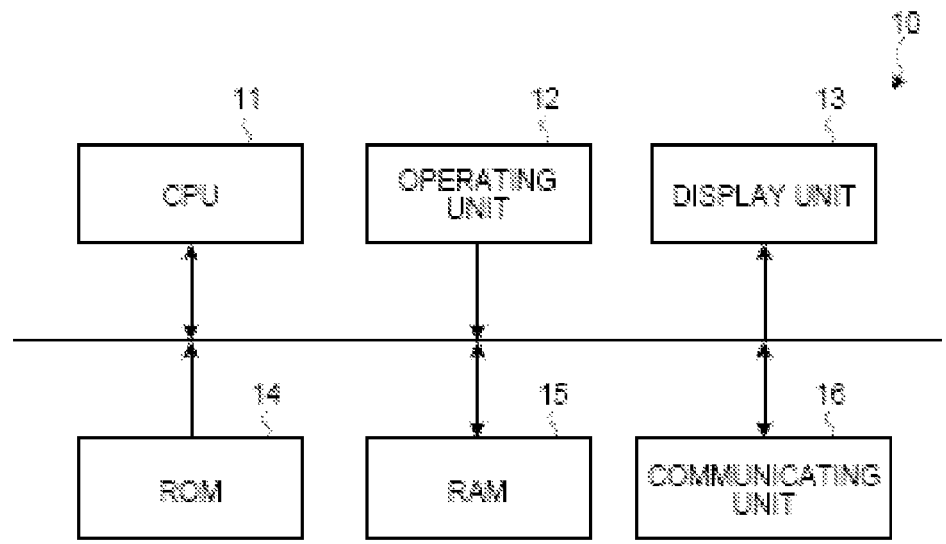
FIG. 2 depicts a hardware configuration of an information communication terminal.

FIG. 2 depicts a hardware configuration of the information communication terminal 10. As shown in FIG. 2, the information communication terminal 10 includes a central processing unit (CPU) 11, an operating unit 12, a display unit 13, a read only memory (ROM) 14, a random access memory (RAM) 15, and the communicating unit 16.

The CPU 11 uses a predetermined area in the RAM 15 as its work area, and works with various control programs previously stored in the ROM 14 to perform various kind of processing, and integrally controls operations of the components that configure the information communication terminal 10.

The CPU 11 works with a predetermined program that is previously stored in the ROM 14 to implement functional units of a content browsing unit 101, a keyword designating unit 102, a browsing-resource transmitting unit 103, a search-method presenting/selecting unit 104, a search-query transmitting unit 105, and a search-result display unit 106 as shown in FIG. 1. Respective operations of the functional units are explained later.

The operating unit 12 includes various input keys, and receives information inputted through an operation by the user as an input signal and outputs the input signal to the CPU 11.

The display unit 13 is composed of a liquid crystal display and the like, and displays various kinds of information based on a display signal from the CPU 11. The display unit 13 can form a touch panel integrally with the operating unit 12.

The ROM 14 unrewritably stores programs associated with control of the information communication terminal 10 and various kinds of setting information.

The RAM 15 is a storage device such as a synchronous dynamic RAM (SDRAM). Because the RAM 15 has a power of rewritably storing various data, the RAM 15 serves as a work area of the CPU 11, and plays a role as a buffer and the like.

The communicating unit 16 is an interface that establishes communications with external devices (the search support server 20, the search engine 30, and the web servers 40) through the network. The communicating unit 16 outputs various kinds of information transmitted from the external devices to the CPU 11, and transmits various kinds of information outputted from the CPU 11 to the external devices.

Figure 3:
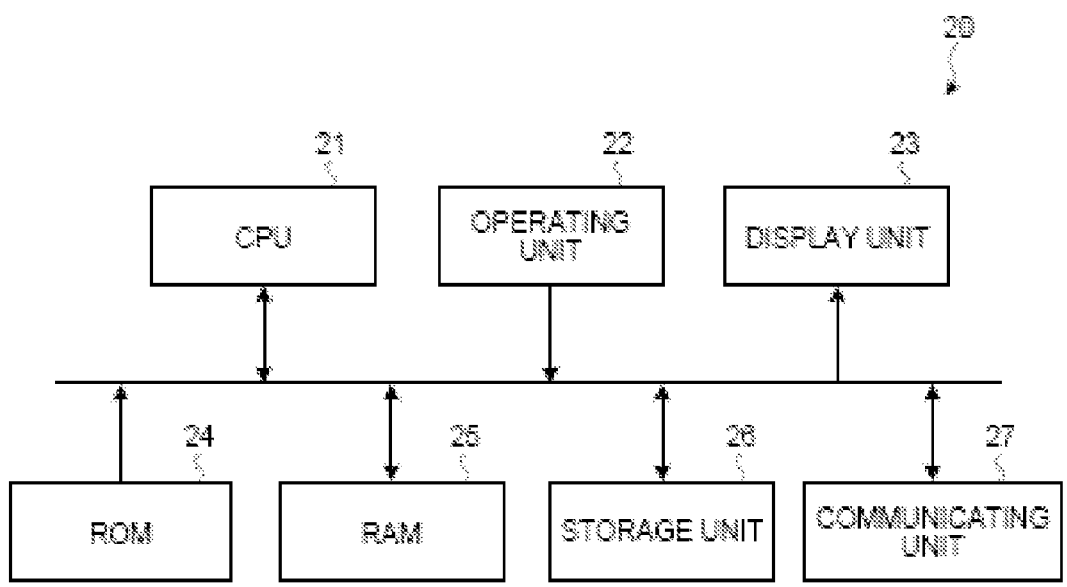
FIG. 3 depicts a hardware configuration of a search support server.

The search support server 20 is explained next. The search support server 20 is a search support device that provides candidates for a search method corresponding to browsing resources (which are explained later) transmitted from the information communication terminal 10, to the information communication terminal 10, based on the browsing resources. FIG. 3 depicts a hardware configuration of the search support server 20. As shown in FIG. 3, the search support server 20 includes a CPU 21, an operating unit 22, a display unit 23, a ROM 24, a RAM 25, a storage unit 26, a communicating unit 27, and the like.

The CPU 21 executes various kinds of processing, working together with various control programs previously stored in the ROM 24 or the storage unit 26, using a predetermined area in the RAM 25 as a work area, and integrally controls respective operations of the components that configure the search support server 20.

The CPU 21 works together with a predetermined program previously stored in the ROM 24 or the storage unit 26 to implement functional units of an input-document resource-obtaining unit 201, a keyword-candidate selecting unit 202, a document-phrase attribute-extracting unit 203, a keyword-meaning estimating unit 204, an input-document theme-estimating unit 205, a site-type estimating unit 206, a content-type estimating unit 207, a search-method candidate-selecting unit 208, a search-method candidate-examining unit 209, and a search-method candidate-menu generator 210 as shown in FIG. 1. The respective operations of the functional units are explained later. The operating unit 22 includes various input keys, and receives information inputted through an operation by a user as an input signal, and outputs the input signal to the CPU 21.

The display unit 23 is composed of an LCD and the like, and displays various kinds of information based on a display signal from the CPU 21. The display unit 23 can configure a touch panel integrally with the operating unit 22.

The ROM 24 unrewritably stores programs associated with control of the search support server 20 and various kinds of setting information.

The RAM 25 is a storage device such as a SDRAM. Because the RAM 25 has a power of rewritably storing various data, the RAM 25 serves as a work area of the CPU 21, and plays a role as a buffer and the like.

The storage unit 26 is a storage device such as a hard disk. The storage unit 26 has a recording medium that is magnetically or optically recordable, and stores programs associated with control of the search support server 20 and various kinds of setting information.

The storage unit 26 stores a morphological analysis dictionary 261, a keyword-meaning estimation rule 262, a phrase attribute database 263, a document-theme estimation rule 264, a site-type estimation rule 265, a content-type estimation rule 266, and a search method model 267 as shown in FIG. 1, in a predetermined area. The information stored in the storage unit 26 is explained later. In the first embodiment, the information is stored in the storage unit 26, while the information can be stored separately in plural storage devices or stored in an external storage device outside the search support server 20.

The communicating unit 27 is an interface that establishes communications with external devices (the information communication terminal 10, the search engine 30, and the web servers 40) through the network. The communicating unit 27 outputs various kinds of information transmitted from the external devices to the CPU 21, and transmits various kinds of information outputted from the CPU 21 to the external devices.

The search engine 30 is a server device or a system that provides a function of searching for contents on a network (not shown) to the information communication terminal 10 or the search support server 20. When receiving a search condition as explained later (a character string formed by combining one or plural phrases under a logical condition such as "OR" and "AND") from the information communication terminal 10 or the search support server 20, the search engine 30 searches for the web servers 40 (websites) corresponding to the search condition. The search engine 30 sends back the total number of websites matching the search condition (the number of retrieved sites), a list of websites matching the search condition, summaries of contents provided by the corresponding websites, and the like.

The web server 40 is a website that stores contents such as hyper text markup language (HTML) documents and images in a storage device such as a hard disk drive (HDD), and provides these contents to be browsed (referred to) by the information communication terminal 10 and the like. The number of the web servers 40 connected to the network is not particularly limited.

An operation performed by the search support system 1 according to the first embodiment is explained below. FIG. 4 is a ladder chart of an operation of a related search process performed between the information communication terminal 10 and the search support server 20. Processes at steps S11 to S18 are performed by the information communication terminal 10, and processes at steps S21 to S31 are performed by the search support server 20.

Figure 5A:
FIGS. 5A to 5E are examples of a screen displayed on a display unit of the information communication terminal.

In the information communication terminal 10, when address information such as a uniform resource locator (URL) indicating an address of the web server 40 is inputted through the operating unit 12 or the like, the content browsing unit 101 acquires a content from the web server 40 corresponding to the address information, and displays the content on the display unit 13 (step S11). FIG. 5A is an example of the content displayed on the display unit 13 at step S11.

When an instruction signal instructing to perform the related search process is inputted through the operating unit 12, the keyword designating unit 102 provides an input support screen to select a specific phrase (character string) in the content displayed on the display unit 13 as a keyword (step S12), and stands by until the keyword is inputted (NO at step S13).

Figure 5B:
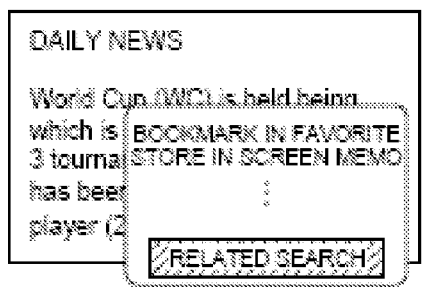

FIGS. 5B to 5E are examples of the screen displayed on the display unit 13 at steps S12 to S13. From a "browser menu" shown in FIG. 5A, the "related search" instructing to perform the related search process is selected as shown in FIG. 5B. When this instruction signal is inputted to the CPU 21, the keyword designating unit 102 provides the user with an interface (input support screen) that enables to select an arbitrary character string from character strings included in the content that is currently browsed. The keyword that can be selected by the user has no limitation, and, for example, can be a partial character string in a phrase.

Figure 5C:
Figure 5D:

FIGS. 5C to 5D depict the interface when a start point and an end point of a keyword to be selected are designated by a cursor. With this interface, a character string "田中" (Tanaka) is selected as a keyword (see FIG. 5E). The input support screen provided by the keyword designating unit 102 is not limited thereto.

Returning to FIG. 4, when the specific keyword (character string) is inputted by the user through the operating unit 12 based on the content displayed on the display unit 13 (YES at step S13), the browsing-resource transmitting unit 103 transmits the keyword inputted at step S13, and the URL or the HTML document of the content that is currently browsed to the search support server 20 as a browsing resource (step S14).

In the search support server 20, when receiving the browsing resource transmitted from the information communication terminal 10, the input-document resource-obtaining unit 201 obtains the keyword and the HTML document included in the browsing resource (step S21), to be outputted to the keyword-candidate selecting unit 202 at the subsequent stage. When the browsing resource does not include the HTML document but includes the URL of the contents instead, the input-document resource-obtaining unit 201 obtains the content from the web server 40 corresponding to the URL, and obtains the HTML document from the content at step S21.

When receiving the keyword and the HTML document from the input-document resource-obtaining unit 201, the keyword-candidate selecting unit 202 performs a keyword-candidate selecting process at step S22. The keyword-candidate selecting process at step S22 is explained below with reference to FIG. 6.

Figure 6:
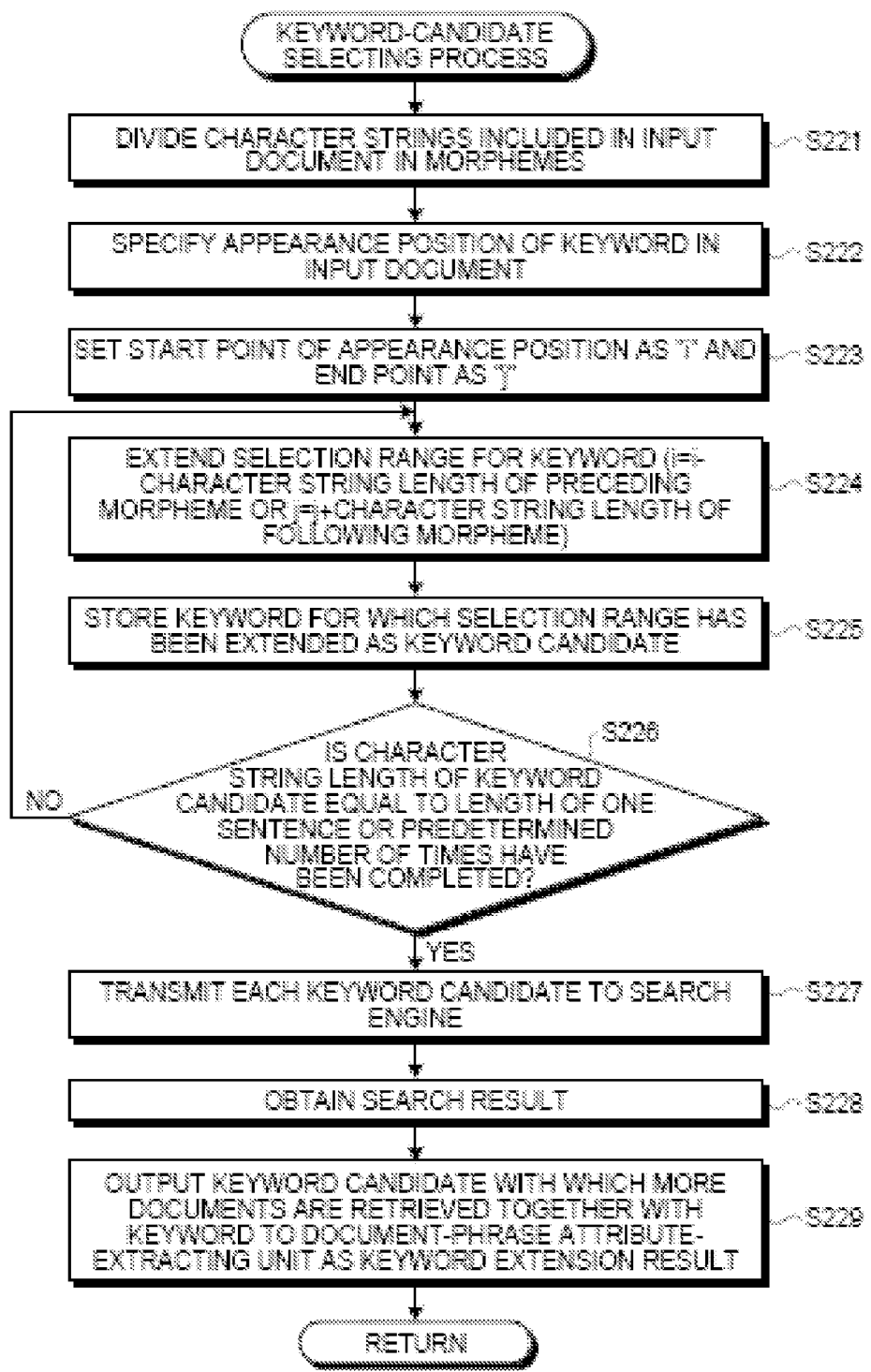
FIG. 6 is a flowchart of a keyword-candidate selecting process.

FIG. 6 is a flowchart of a keyword-candidate selecting process procedure performed by the keyword-candidate selecting unit 202. The keyword-candidate selecting unit 202 regards the inputted HTML document as an input document, and divides character strings included in the input document into morphemes based on the morphological analysis dictionary 261 (step S221).

The morphological analysis dictionary 261 is a table in which various morphemes and attributes of these morphemes are previously related. The division in units of morphemes is performed by comparing the morphemes included in the morphological analysis dictionary 261 and the character stings included in the input document, to be divided into matched character strings. The attribute of a morpheme is the word class, the conjugation type, additional information (for example, country name and personal name), the reading, the pronunciation, and the like of the morpheme. The attribute is previously defined for each morpheme.

The keyword-candidate selecting unit 202 specifies from which word to which word the inputted keyword appears in the input document (step S222), sets the start point of the appearance position as "i" and the end point thereof as "j", and stores the positional information in the RAM 25 or the like (step S223).

The keyword-candidate selecting unit 202 subtracts the character string length of a word corresponding to a morpheme preceding the keyword, from the start point "i" of the keyword, or adds the character string length of a word corresponding to a morpheme following the keyword, to the end point "j" of the keyword, to extend a selection range of the keyword in units of morphemes (step S224). The keyword-candidate selecting unit 202 stores the keyword for which the selection range has been extended, in the RAM 25 or the like, as a keyword candidate (step S225).

Figure 5E:
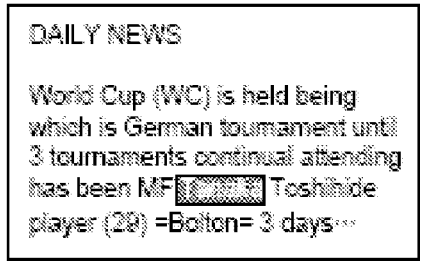

Taking FIG. 5E for example, when the selection range extending process (step S224) is applied once forward the document (in a direction preceding the keyword) with reference to a keyword "Tanaka", the keyword candidate is "Tanaka". Similarly, when the selection range extending process (step S224) is applied once backward the document (in a direction following the keyword) with reference to the keyword "MF Tanaka", the keyword candidate is "Tanaka Toshihide". In the first embodiment, the process is performed for a morpheme preceding or following the keyword, while the process can be performed for morphemes preceding and following the keyword.

The keyword-candidate selecting unit 202 then determines whether the length of a character string of the keyword candidate is equal to the length of a sentence including the keyword, or whether the selection range extension has been performed a predetermined number of times. When any of the above conditions is not satisfied (NO at step S226), the keyword-candidate selecting unit 202 returns to step S224, to further extend the selection range of the keyword with reference to the keyword candidate obtained in the previous selection range extending process.

When determining that the length of the character string of the keyword candidate is equal to the length of the sentence including the keyword, or that the selection range extension has been performed the predetermined number of times (YES at step S226), the keyword-candidate selecting unit 202 transmits each of the character strings that are obtained as the keyword candidates to the search engine 30 (step S227), and receives a result of a search corresponding to each character string from the search engine 30 (step S228).

The keyword-candidate selecting unit 202 outputs a higher keyword candidate with which more documents are retrieved, among the obtained search results together with the inputted keyword, as a keyword extension result to the document-phrase attribute-extracting unit 203 (step S229). The process then proceeds to step S23 in FIG. 4. The number of the keyword candidates outputted to the document-phrase attribute-extracting unit 203 is not particularly limited. For example, the highest keyword candidate or higher three keyword candidates can be outputted. The keyword candidates obtained until step S226 and the keyword can be outputted as the keyword extension result to the document-phrase attribute-extracting unit 203 at step S229, without executing the processes at steps S227 and S228.

Returning to FIG. 4, when receiving the keyword extension result from the keyword-candidate selecting unit 202, the document-phrase attribute-extracting unit 203 performs a phrase-attribute analyzing process at step S23. The phrase-attribute analyzing process at step S23 is explained with reference to FIGS. 7 and 8.

Figure 7:
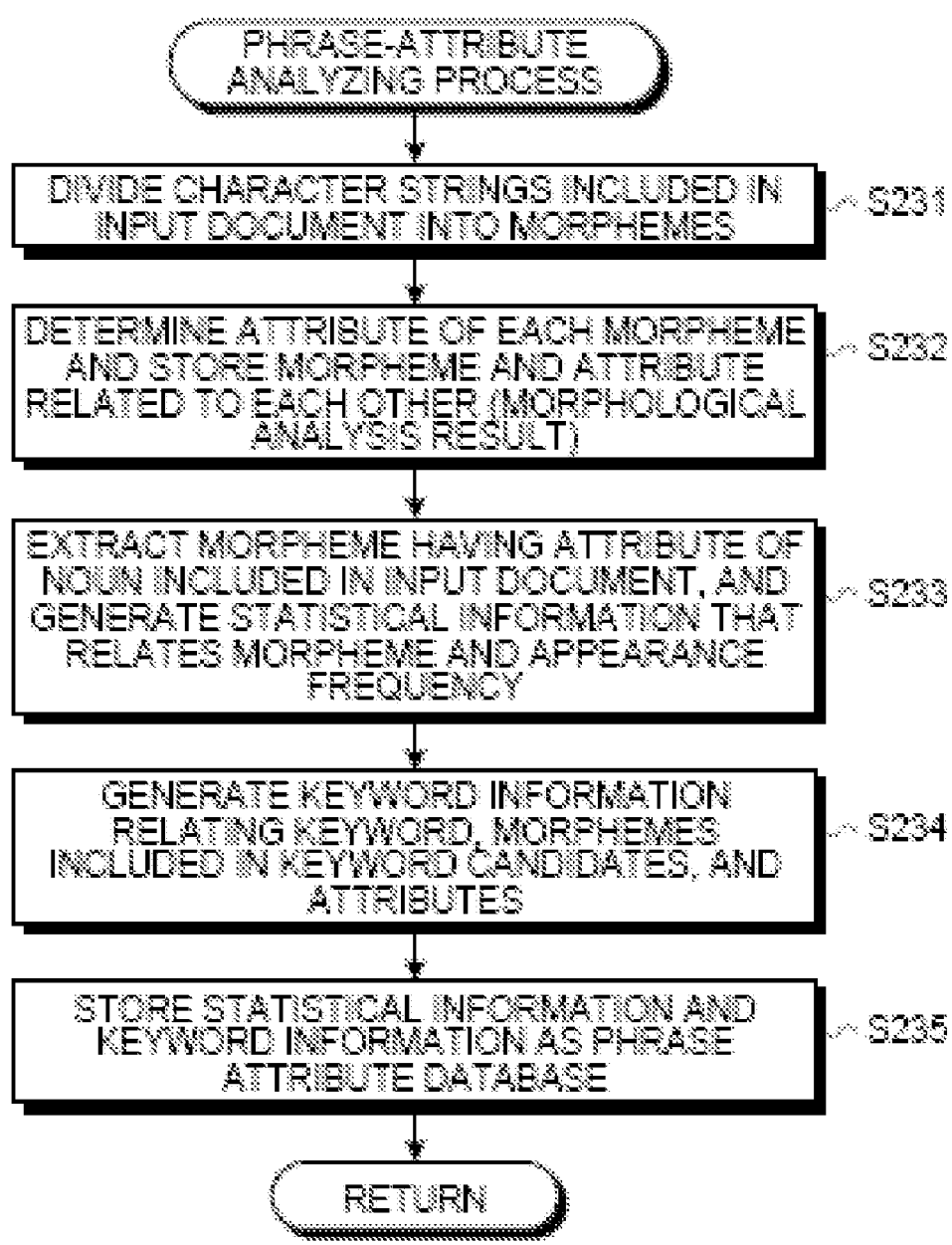
FIG. 7 is a flowchart of a phrase-attribute analyzing process.

FIG. 7 is a flowchart of a phrase-attribute analyzing process procedure performed by the document-phrase attribute-extracting unit 203. The document-phrase attribute-extracting unit 203 applies a morphological analysis to the input document based on the morphological analysis dictionary 261, to divide the document into morphemes (step S231). The document-phrase attribute-extracting unit 203 determines respective attributes of the morphemes to generate a table relating the morphemes and the attributes, and stores the table as a morphological analysis result in the RAM 25 or the like (step S232).

The document-phrase attribute-extracting unit 203 extracts morphemes having the attribute of noun, included in the entire input document, from the morphological analysis result, and generates statistical information relating the morphemes and the frequency of appearance thereof (step S233). The document-phrase attribute-extracting unit 203 applies the morphological analysis to the keyword extension result based on the morphological analysis dictionary 261, to divide the keyword and character strings included in the keyword candidate in units of morphemes. The document-phrase attribute-extracting unit 203 determines the respective attributes of the morphemes, to generate keyword information relating the morphemes and the respective attributes (step S234). The document-phrase attribute-extracting unit 203 regards the statistical information and the keyword information as the phrase attribute database 263, and stores the phrase attribute database 263 in the storage unit 26 (step S235).

In the first embodiment, the morphological analysis of the input document is performed at step S231. When the similar morphological analysis to that at step S231 is performed at step S221 in the keyword-candidate selecting process (see FIG. 6), the result of the morphological analysis at step S221 can be employed.

Figure 8:
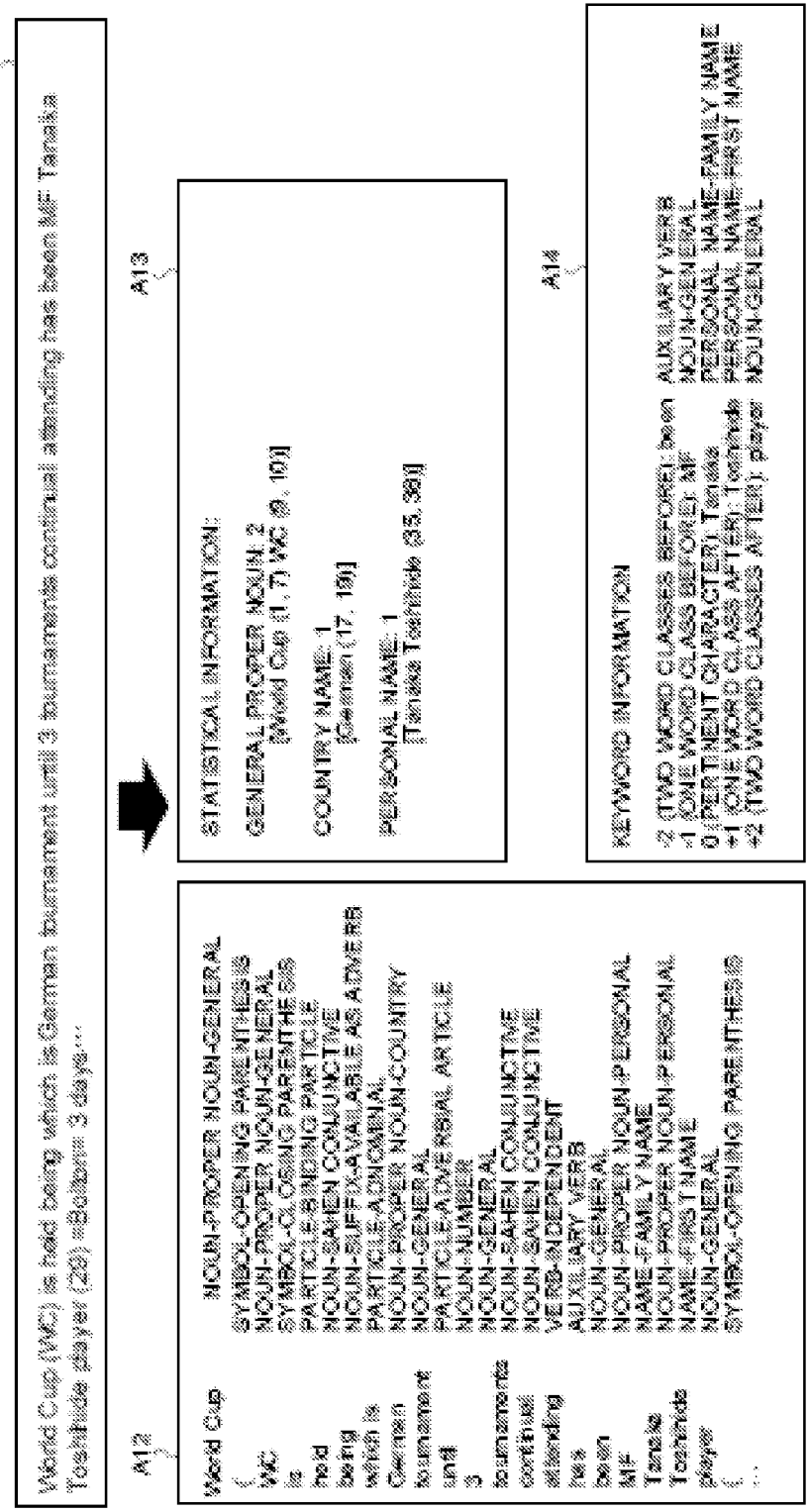
FIG. 8 is a schematic diagram for explaining the phrase-attribute analyzing process.

FIG. 8 is a schematic diagram for explaining the phrase attribute database 263. It is assumed that a character string denoted by A11 is inputted as the input document.

At step S231, the document-phrase attribute-extracting unit 203 applies the morphological analysis to the input document to divide the document in units of morphemes, and generates a morphological analysis result including the morphemes and the attributes being related to each other. The result of the morphological analysis for the character string A11 is denoted by A12. To each of the morphemes (such as "World Cup") included in the character string A11, its attribute (such as noun-proper noun-general) is related.

An example of the statistical information derived from the morphological analysis result A12 is denoted by A13. In the exemplary statistical information A13, the proper nouns (noun-proper noun) are extracted from the morphological analysis result of the entire input document.

Specifically, the document-phrase attribute-extracting unit 203 selects "World Cup" as a morpheme having the attribute of the general proper noun (noun-proper noun-general) from the morphological analysis result (see A12), and identifies a position of appearance of this word class in the input document, from the input document. The document-phrase attribute-extracting unit 203 relates the word class type, the word class corresponding to the word class type, and the appearance position. The statistical information A13 indicates that "World Cup" appears from the 1st to 7th (1, 7) characters in the input document.

Similarly, the document-phrase attribute-extracting unit 203 selects "WC (noun-proper noun-general)", "Germany (noun-proper noun-country name)", and "Tanaka Toshihide (noun-proper noun-personal name-family name, noun-proper noun-personal name-first name)" as morphemes having the attribute of proper noun from the morphological analysis result, and relates the word class type and the appearance position to each of the morphemes. The document-phrase attribute-extracting unit 203 calculates the number of selected morphemes for each of the attribute types (such as general proper noun, country name, and personal name), and relates the morphemes corresponding to each of the attribute types and the appearance positions, to generate the statistical information (see A13). In the statistical information A13, a number (for example, "2") attached to the attribute type indicates the number of morphemes belonging to this attribute.

An example of the keyword information is denoted by A14. In the exemplary keyword information A14, "Tanaka" included in the character string A11 is designated as a keyword. In this example, "been MF Tanaka Toshihide player" is imputed as the keyword candidate. In the exemplary keyword information A14, appearance position information "0 (pertinent character)" indicating that this is a keyword as a reference (reference keyword) is assigned to "Tanaka".

Specifically, the document-phrase attribute-extracting unit 203 divides the character string included in the keyword and the keyword candidate based on the morphological analysis result (see A12), into morphemes of "been", "M F", "Tanaka", "Toshihide", "player", as shown in A14. The document-phrase attribute-extracting unit 203 generates keyword information of the divided morphemes each being related to the attribute.

Appearance position information corresponding to the appearance position with respect to the reference keyword is attached to each of the morphemes recorded in the keyword information. In the first embodiment, for a word class appearing before the reference keyword, appearance position information that is obtained by subtracting the number of morphemes before the reference keyword from 0 (such as −1 (one word class before)) is attached, as shown in A14. For a word class appearing after the reference keyword, appearance position information that is obtained by adding the number of morphemes after the reference keyword to 0 (such as +1 (one word class after)) is attached.

Returning to FIG. 4, the keyword-meaning estimating unit 204 performs a keyword-meaning estimating process at step S24. The keyword-meaning estimating unit is equivalent to an affair determining unit. The keyword-meaning estimating process at step S24 is explained below with reference to FIGS. 9 and 10.

Figure 9:
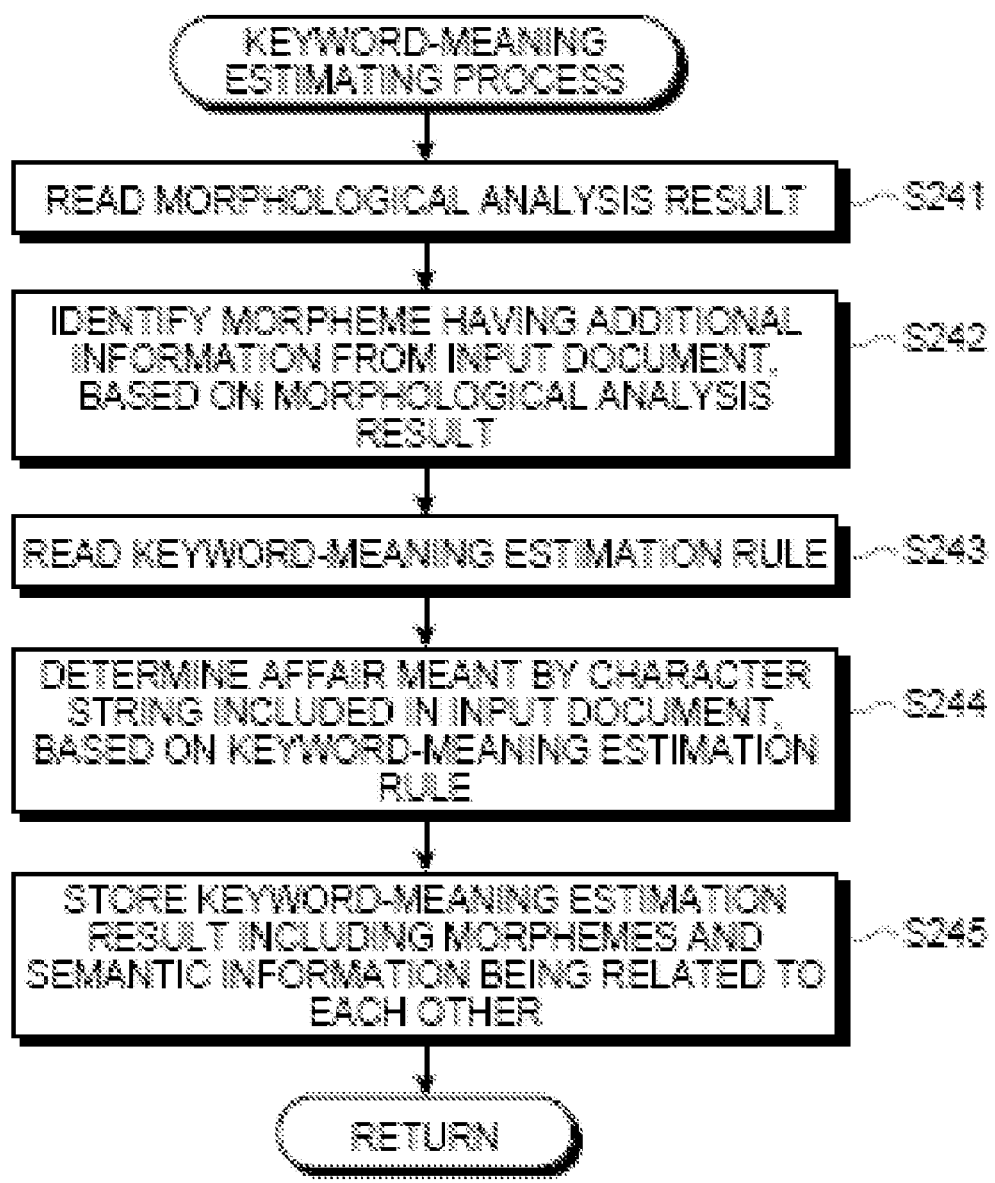
FIG. 9 is a flowchart of a keyword-meaning estimating process.

FIG. 9 is a flowchart of a keyword-meaning estimating process procedure performed by the keyword-meaning estimating unit 204. The keyword-meaning estimating unit 204 reads the morphological analysis result obtained by the document-phrase attribute-extracting unit 203 from the RAM 25 or the like (step S241).

The keyword-meaning estimating unit 204 identifies morphemes having additional information such as the country name and the personal name among the morphemes included in the input document, based on the morphological analysis result (step S242).

The keyword-meaning estimating unit 204 reads the keyword-meaning estimation rule 262 stored in the storage unit 26 (step S243), and determines an affair that is meant by character strings (such as morphemes having the attributes of noun or symbol) included in the input document, based on the keyword-meaning estimation rule 262 (step S244).

The keyword-meaning estimation rule 262 is a table that previously relates specific character strings and affairs meant by the character strings. The keyword-meaning estimating unit 204 compares the character strings defined by the keyword-meaning estimation rule 262 and the character strings in the input document, to determine an affair that is meant by a matched character string. The "affair that is meant" indicates a matter that can be evoked by a predetermined character string. For example, an "event" is related to character strings "World Cup" and "WC", as the affair.

The keyword-meaning estimating unit 204 relates corresponding additional information and affairs (hereinafter, semantic information) to the morphemes identified at step S242 and the character string to which the determination is performed at step S244, among the character strings (morphemes) included in the input document, to be stored in the RAM 25 or the like as a keyword-meaning estimation result (step S245). The process then proceeds to step S25 in FIG. 4.

Figure 10:
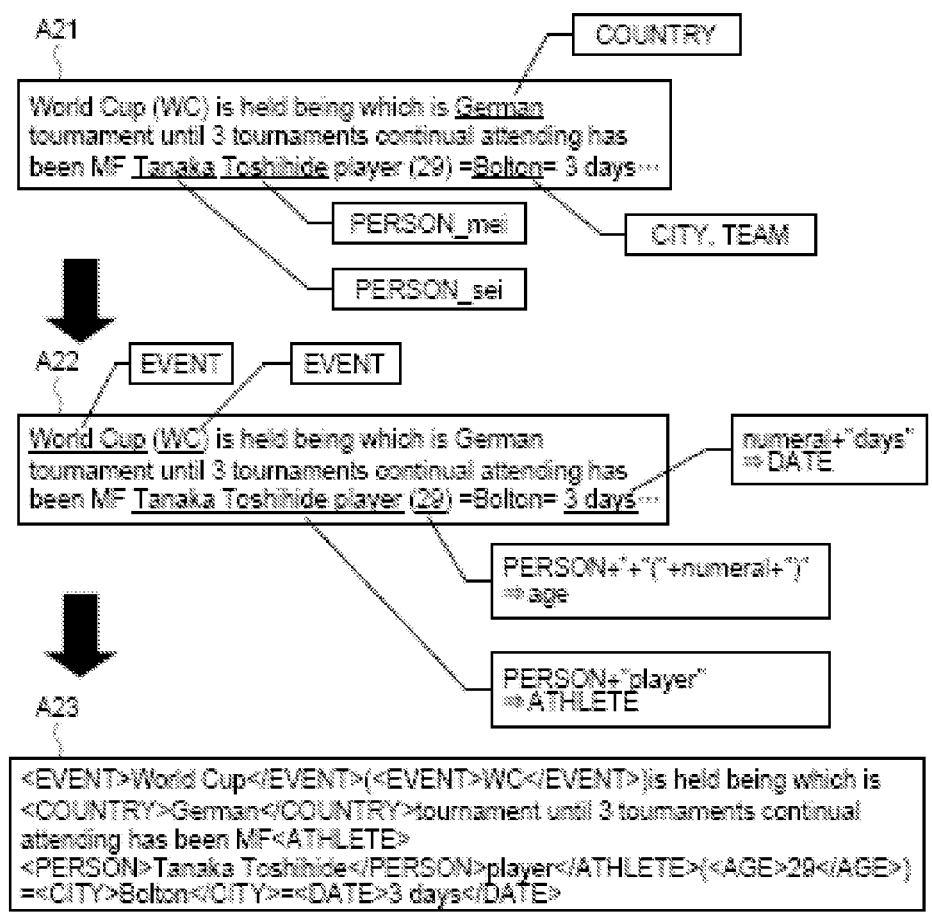
FIG. 10 is a schematic diagram for explaining the keyword-meaning estimating process.

FIG. 10 is a schematic diagram for explaining the keyword-meaning estimating process. In FIG. 10, a state in which morphemes having additional information such as the country name and the personal name, among the morphemes included in the input document, are identified is schematically shown in A21 at the top. In this case, a morpheme "Germany" has additional information of the country name (COUNTRY). Similarly, a morpheme "Tanaka" has additional information of personal name-family name (PERSON_sei), a morpheme "Toshihide" has additional information of personal name-first name (PERSON_mei), and a morpheme "Bolton" has additional information of the city name (CITY, TEAM).

A result of the determination for an affair that is evoked by the specific character string, performed by applying the keyword-meaning estimation rule 262 to the input document is schematically shown in A22 in the middle. An affair of "event (EVENT)" is related to the character strings "World Cup" and "WC" in the keyword-meaning estimation rule 262. An affair of "athlete (ATHLETE)" is related to a combination of a character string having the attribute of personal name (PERSON)+a character string "player".

In the keyword-meaning estimation rule 262, with regard to a combination of a character string having the attribute of personal name (PERSON)+an arbitrary character string "(wild card)"+a term "( )+a character string having the attribute of number (numeral)+a character string ' '", an affair of "age (AGE)" is related to the character string having the attribute of number (numeral). An affair of "date (DATE)" is related to a combination of a character string having the attribute of number (numeral)+a character string "day".

An example of the semantic analysis result is shown in A23 at the bottom. In this example, semantic information represented in a tag (a character string put between "<" and ">") format is embedded before and after the pertinent character string (morpheme), to be related to the corresponding character string, as shown in A23. In the first embodiment, the semantic information is related in a tag format, while any method can be alternatively employed.

Returning to FIG. 4, at step S25, the input-document theme-estimating unit 205 performs a document-theme estimating process. The document-theme estimating process at step S25 is explained below with reference to FIGS. 11 and 12.

Figure 11:
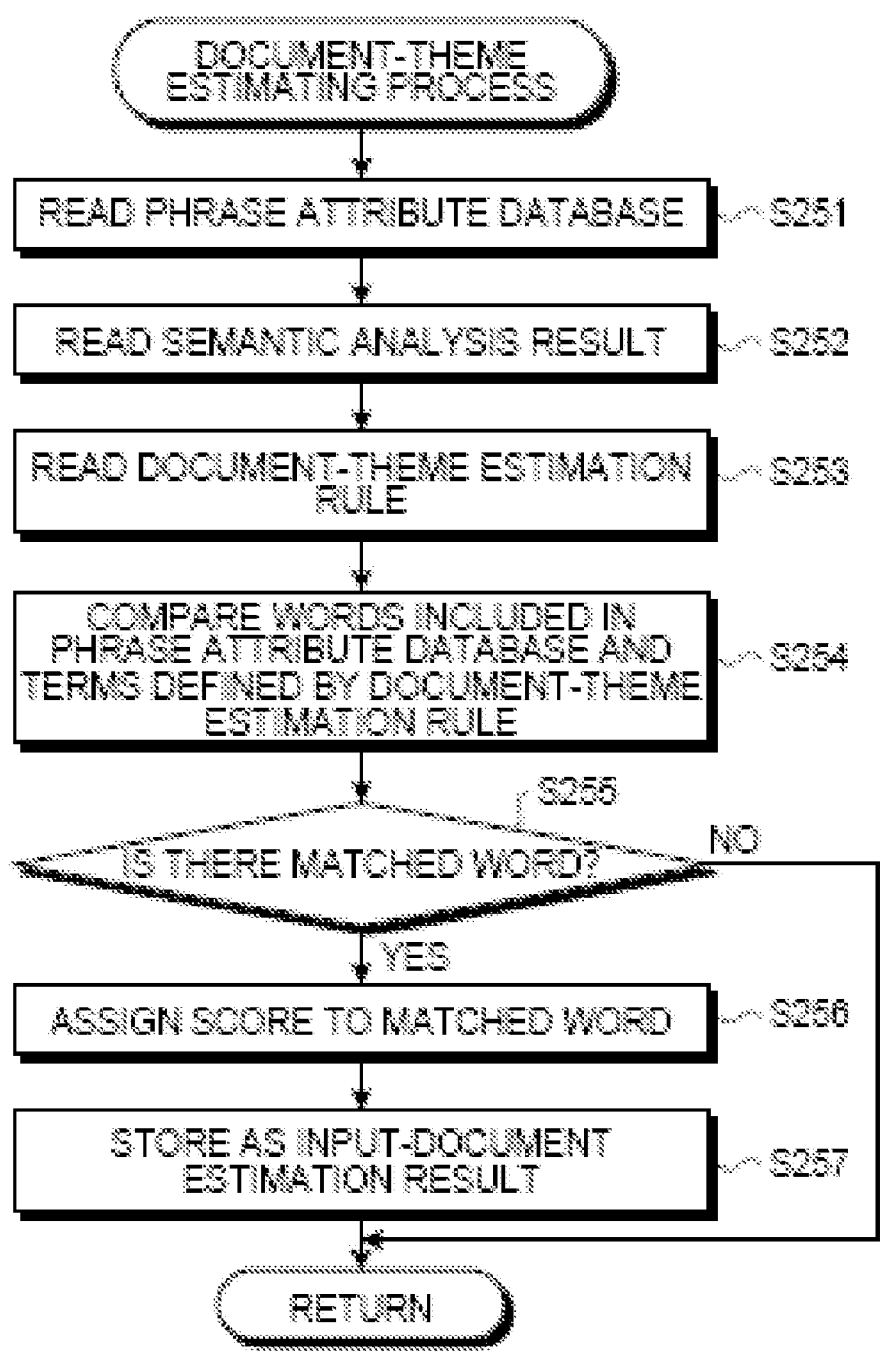
FIG. 11 is a flowchart of a document-theme estimating process.

FIG. 11 is a flowchart of a document-theme estimating process procedure performed by the input-document theme-estimating unit 205. The input-document theme-estimating unit 205 reads the phrase attribute database 263 stored in the storage unit 26 (step S251), and reads the semantic analysis result stored in the RAM 25 or the like (step S252).

The input-document theme-estimating unit 205 reads the document-theme estimation rule 264 stored in the storage unit 26 (step S253), and compares words (morphemes) included in the phrase attribute database 263 and terms defined by the document-theme estimation rule 264 (step S254).

The document-theme estimation rule 264 is explained with reference to A33 in FIG. 12. The document-theme estimation rule 264 defines themes representing fields, and terms associated with the themes, being related to each other. In an example denoted by A33, the document-theme estimation rule 264 has a hierarchical structure, and defines high conception words representing themes of different fields and low conception words as terms associated with the high conception words, being related to each other. As shown in the example A33, "golf, soccer, baseball" are related as low conception words to a high conception word "sports".

Words associated with each of the conception words are defined as a vocabulary list. For example, for the high conception word "sports", "player, competition, match, . . . " are defined as a vocabulary list associated with the sports. As a vocabulary list associated with "golf", "hole, stroke, par" are defined. Similarly, "goal, WC, keeper" are defined for "soccer", and "stadium, homer, . . . " are defined for "baseball". At step S254, the input-document theme-estimating unit 205 determines whether the phrase attribute database 263 includes words matching the terms included in the vocabulary list.

Returning to FIG. 11, when the input-document theme-estimating unit 205 determines that the phrase attribute database 263 includes no word matching the terms defined by the document-theme estimation rule 264, from a result of the comparison at step S254 (NO at step S255), the process proceeds directly to step S26 in FIG. 4.

When determining that the phrase attribute database 263 includes words matching the terms defined by the document-theme estimation rule 264 from the result of the comparison at step S254 (YES at step S255), the input-document theme-estimating unit 205 assigns a predetermined score to a theme associated with the matched word (step S256). The score is a numerical value that is previously assigned to a specific morpheme included in the statistical information and the keyword information. When a term (morpheme) is peculiar to a specific theme, a higher value is assigned.

The input-document theme-estimating unit 205 relates the theme associated with the matched term and its score, to be stored in the RAM 25 or the like as an input-document estimation result (step S257), and the process proceeds directly to step S26 in FIG. 4.

Figure 12:
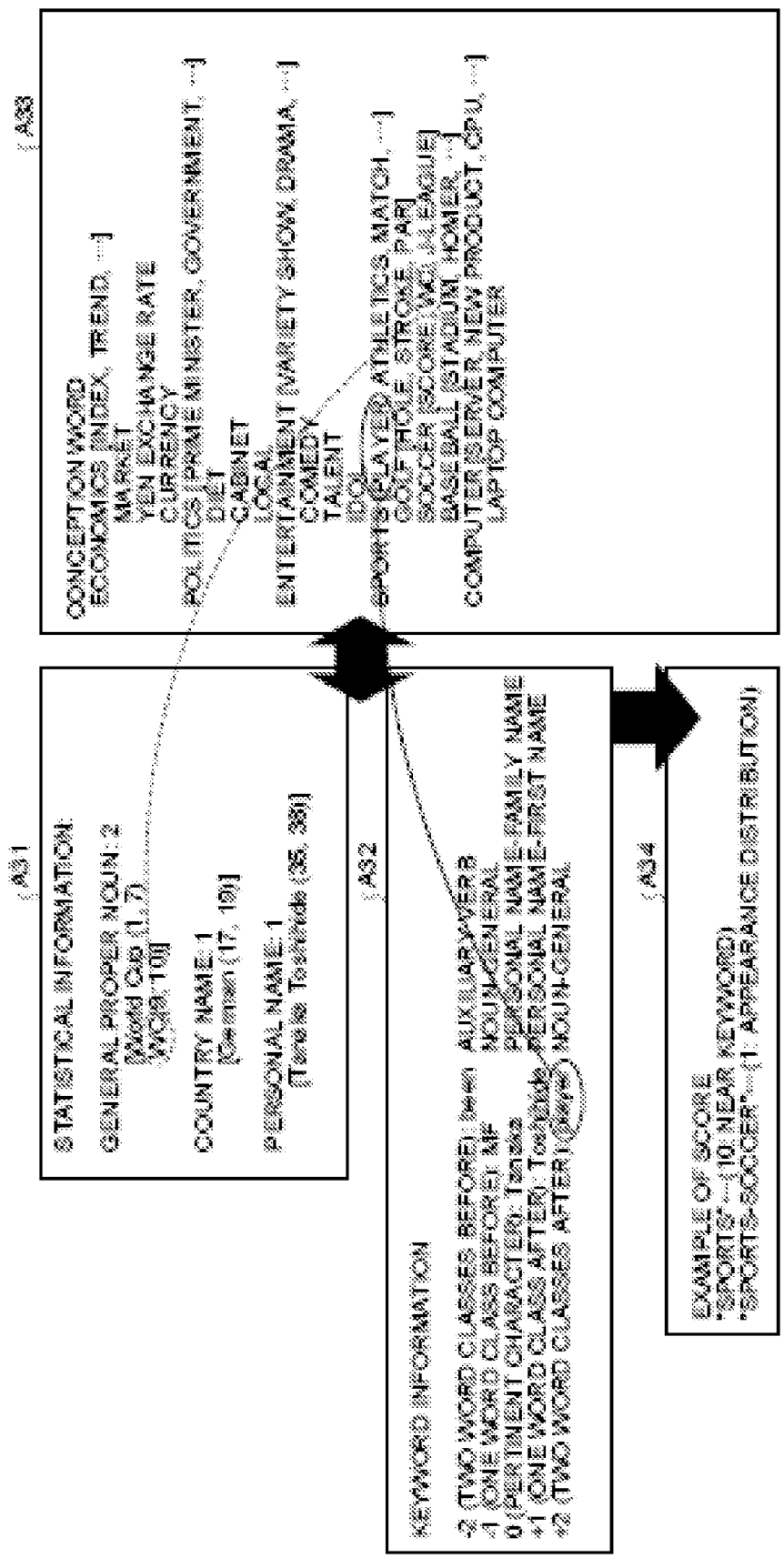
FIG. 12 is a schematic diagram for explaining the document-theme estimating process.

FIG. 12 is a schematic diagram for explaining the document-theme estimating process. In FIG. 12, the statistical information included in the phrase attribute database 263 is denoted by A31, and the keyword information is denoted by A32. An example of the document-theme estimation rule 264 is denoted by A33.

An example of the document-theme estimating process is explained below with reference to A31 to A34. A score "1" is assigned to "WC" included in the statistical information, and a score "10" is assigned to "player" included in the keyword information.

The input-document theme-estimating unit 205 applies the document-theme estimation rule 264 denoted by A33 to the phrase attribute database 263 denoted by A31 and A32, to determine that "player" defined by "+2 (two word classes after)" in the keyword information matches a high conception word "sports" in the document-theme estimation rule 264. In this case, the input-document theme-estimating unit 205 adds the score "10" allocated to "player", to the high conception word "sports".

The input-document theme-estimating unit 205 determines that "WC" in the statistical information matches a low conception word "sports-soccer" in the document-theme estimation rule 264. In this case, the input-document theme-estimating unit 205 adds the score "1" allocated to "WC", to the low conception word "sports-soccer".

The input-document theme-estimating unit 205 finally derives the score "10" for "sports" and the score "1" for "sports-soccer" as shown in A34, and stores the derived scores in the RAM 25 or the like as an input-document estimation result.

Returning to FIG. 4, at step S26, the site-type estimating unit 206 performs a site-type estimating process. The site-type estimating process at step S26 is explained below with reference to FIGS. 13 and 14.

Figure 13:
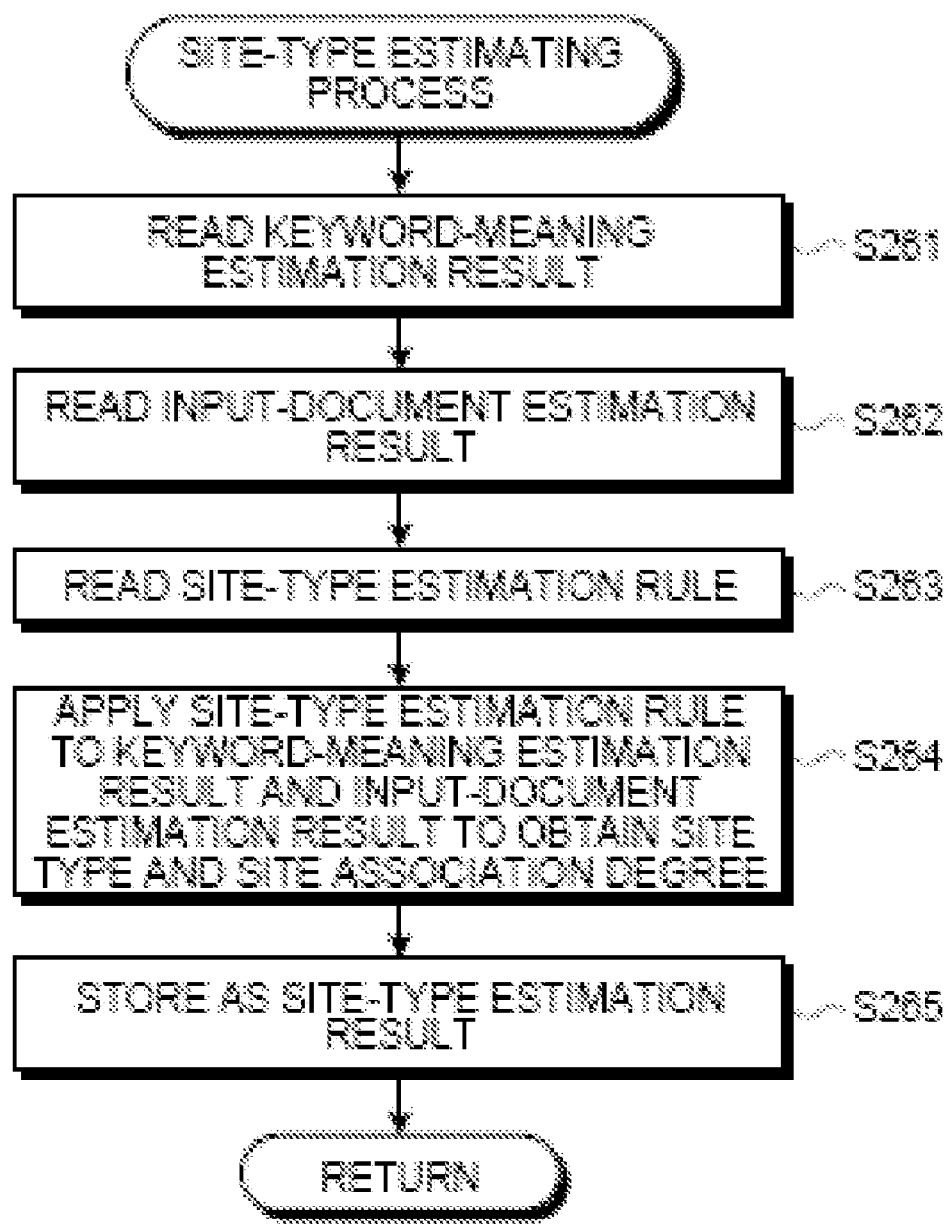
FIG. 13 is a flowchart of a site-type estimating process.

FIG. 13 is a flowchart of a site-type estimating process procedure performed by the site-type estimating unit 206. The site-type estimating unit 206 reads the keyword-meaning estimation result stored in the RAM 25 (step S261), and reads the input-document estimation result (step S262).

The site-type estimating unit 206 reads the site-type estimation rule 265 previously stored in the storage unit 26 (step S263). The site-type estimating unit 206 applies the site-type estimation rule 265 to the keyword-meaning estimation result and the input-document estimation result, to obtain a site type and a degree of site association, which are explained later (step S264). The site-type estimating unit 206 relates the obtained site type and site association degree, to be stored in the RAM 25 or the like as a site-type estimation result (step S265), and the process proceeds to step S27 in FIG. 4.

Figure 14:
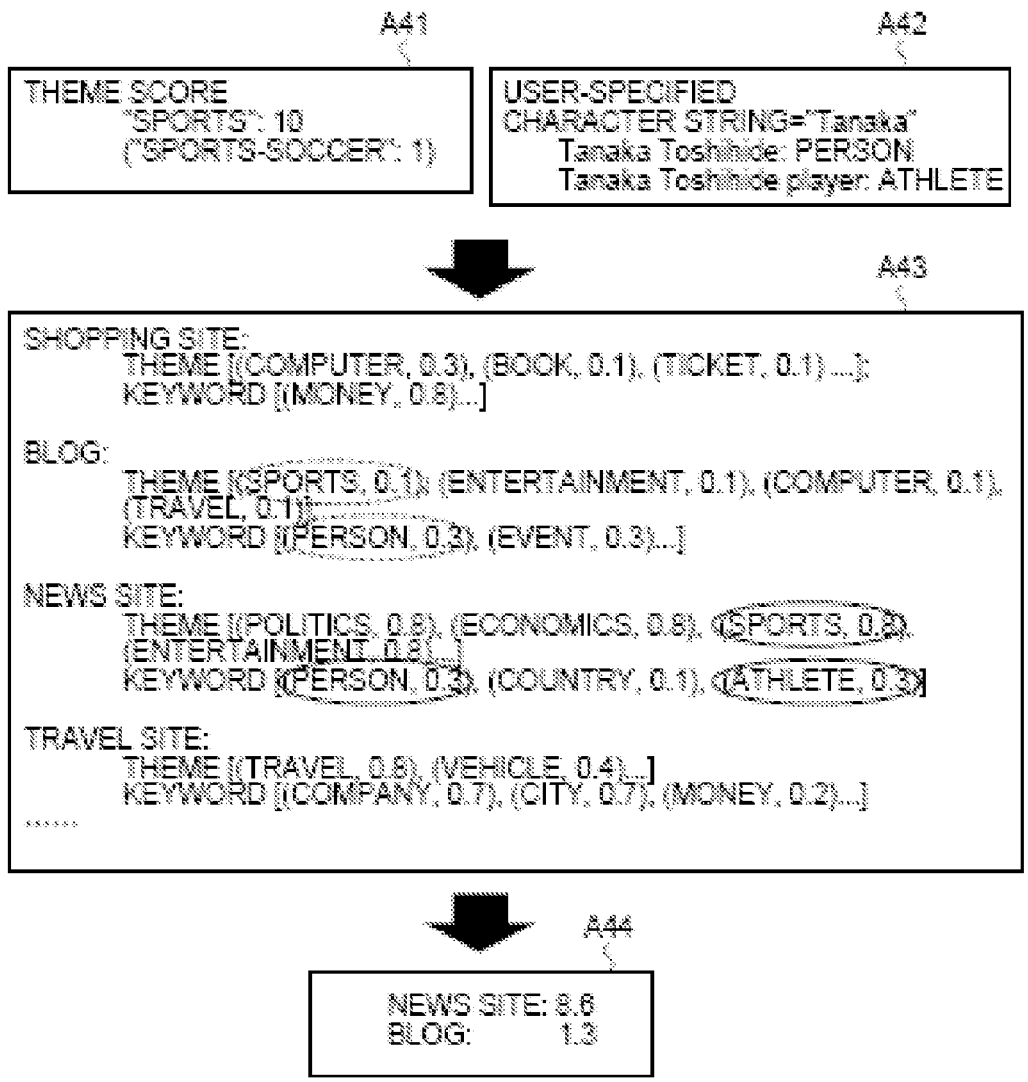
FIG. 14 is a schematic diagram for explaining the site-type estimating process.

FIG. 14 is a schematic diagram for explaining the site-type estimation process. In FIG. 14, an example of the input-document estimation result is denoted by A41, and an example of the keyword-meaning estimation result is denoted by A42. An example of the site-type estimation rule 265 is denoted by A43, and an example of the site-type estimation result is denoted by A44. The keyword-meaning estimation result A42 has different expressions from those denoted by A23 in FIG. 10, while it has the same meanings.

The site-type estimation rule 265 is explained first with reference to A43 in FIG. 14. The site-type estimation rule 265 defines themes representing different fields, semantic information, and site types, being related to each other. In the example denoted by A43, names of the site types such as "shopping site", "Blog", "news site", and "travel site" are defined. For each of the site types, "themes" representing fields and "keywords" corresponding to the semantic information are defined. Predetermined values are defined for words included in the "theme" and the "keyword", as weighting on the respective words.

For example, when the site type is the "shopping site", "computer, book, ticket, . . . " are defined as associated themes, and "0.3", "0.1", and "0.1" are defined for weighting on the respective words. Keywords associated with the "shopping site" are similarly defined. "MONEY" and the like are related thereto, and the weighting is defined as "0.8".

Similarly, in the site type of "Blog", "sports, entertainment, computer" and the like are defined as associated themes with weighting of "0.1", respectively, "PERSON", "EVENT", and the like are defined as keywords, with weighting of "0.3", respectively.

In the site type of "news site", "politics, economics, sports, entertainment, . . . " are defined as associated themes, with weighting of "0.8", respectively. "PERSON" with weighting of "0.3", "COUNTRY" with weighting of "0.1", and "ATHLETE" with weighting of "0.3" are defined as keywords.

In the site type of "travel site", "travel" with weighting of "0.8" and "vehicle" with weighting of "0.4" are defined as associated themes. As keywords, "COMPANY" and "CITY" with weighting of "0.7", respectively, and "MONEY" with weighting of "0.2" are defined.

The site-type estimating unit 206 applies the site-type estimation rule 265 to the input-document estimation result and the keyword-meaning estimation result which are obtained in the processes by the previous stage, to determine that "sports" included in the input-document estimation result matches the theme of "sports" in the site types of "Blog" and "news site".

Because the weightings allocated to "sports" are defined as "0.1" for "Blog" and "0.8" for "news site", the site-type estimating unit 206 reads these values, and multiplies the score "10" assigned to "sports" of the input-document estimation result by these weighting values, respectively. Specifically, calculation of 0.1×10=1.0 for the site type of "Blog" and calculation of 0.8×10=8.0 for the site type of "news site" is performed.

The site-type estimating unit 206 refers to the keyword-meaning estimation result, and determines that "PERSON" included in the keyword-meaning estimation result matches "PERSON" defined by the weighting value "0.3" in the associated keywords in the site type of "Blog", and matches "PERSON" defined by the weighting value "0.3" in the associated keywords in the site type of "news site". The site-type estimating unit 206 determines that "ATHLETE" included in the keyword-meaning estimation result matches "ATHLETE" defined by weighting value "0.3" in the associated keywords in the site type of "news site".

The site-type estimating unit 206 adds these weighting values to the previously-derived result of the multiplication of the weighting value of the site type and the score, respectively, to derive the degree of association with the site type (site association degree). Specifically, the site association degree for the site type "Blog" is calculated as 1.0+0.3=1.3, and the site association degree for the site type "news site" is calculated as 8.0+0.3+0.3=8.6. The site-type estimating unit 206 obtains sets of the site type and the association degree as the site type estimation result, as shown by A44. The site types included in the site-type estimation result are estimated types of websites that might have been browsed by the user of the information communication terminal 10. The site association degree represents the certainty (probability) of the estimation, using numerical values.

Returning to FIG. 4, at step S27, the content-type estimating unit 207 performs a content-type estimating process. The content-type estimating process at step S27 is explained below with reference to FIGS. 15 and 16.

Figure 15:
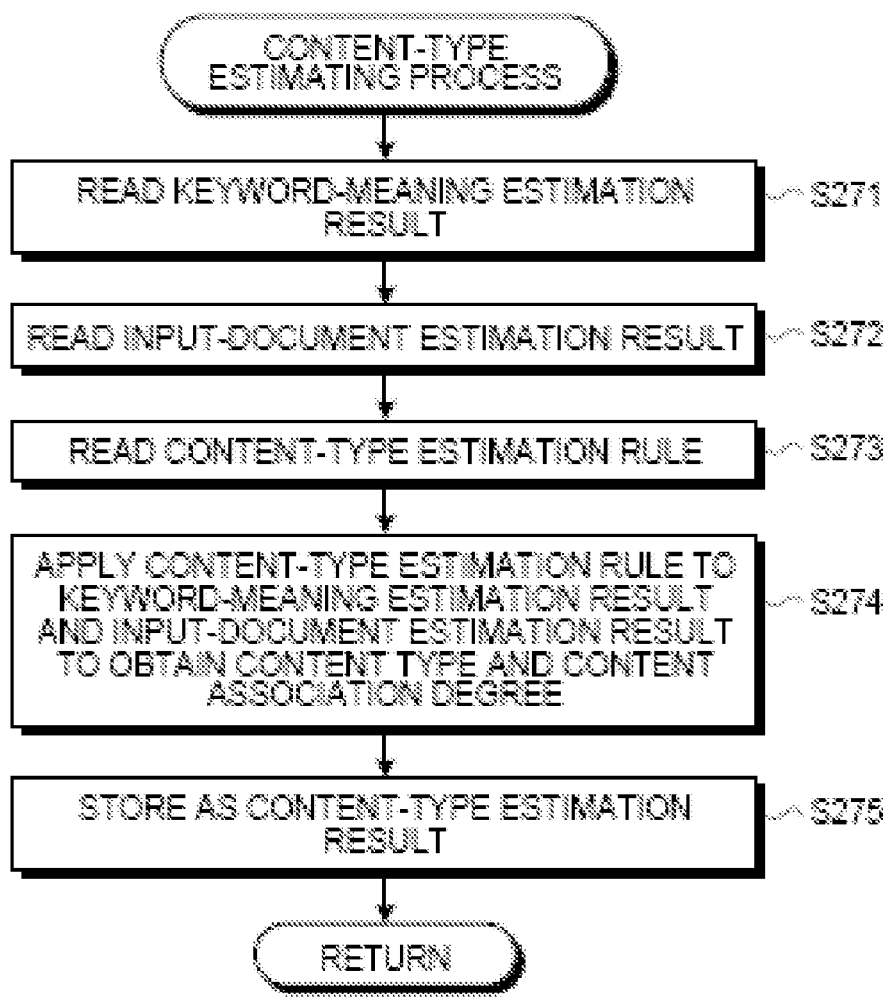
FIG. 15 is a flowchart of a content-type estimating process.

FIG. 15 is a flowchart of a content-type estimating process procedure performed by the content-type estimating unit 207. The content-type estimating unit 207 reads the keyword-meaning estimation result stored in the RAM 25 (step S271), and reads the input-document estimation result (step S272).

The content-type estimating unit 207 reads the content-type estimation rule 266 previously stored in the storage unit 26 (step S273). The content-type estimating unit 207 applies the content-type estimation rule 266 to the keyword-meaning estimation result and the input-document estimation result, to obtain a content type and a content association degree, which are explained later (step S274). The content-type estimating unit 207 relates the obtained content type and content association degree to be stored in the RAM 25 or the like as a content-type estimation result (step S275). The process then proceeds to step S28 in FIG. 4.

Figure 16:
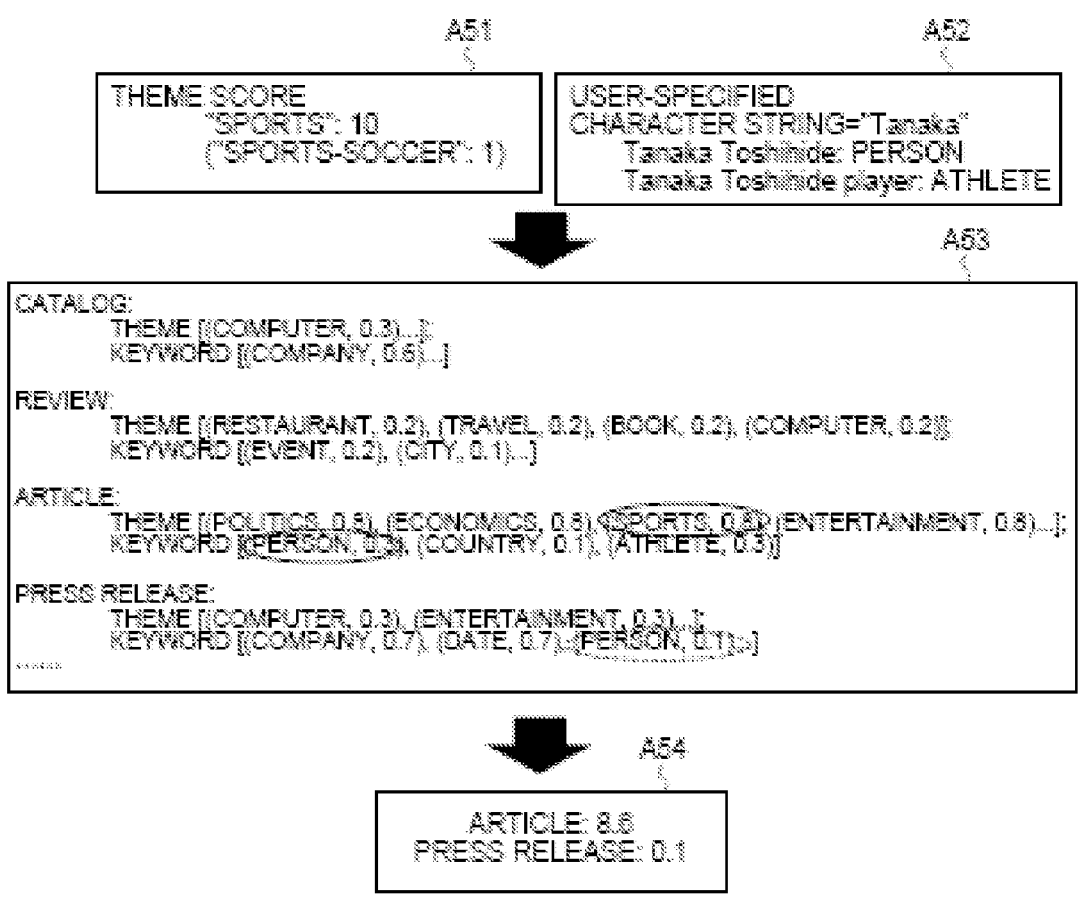
FIG. 16 is a schematic diagram for explaining the content-type estimating process.

FIG. 16 is a schematic diagram for explaining the content-type estimating process. In FIG. 16, an example of the input-document estimation result is denoted by A51, and an example of the keyword-meaning estimation result is denoted by A52. An example of the content-type estimation rule 266 is denoted by A53, and an example of the content-type estimation result is denoted by A54.

The content-type estimation rule 266 is explained with reference to A53 in FIG. 16. The content-type estimation rule 266 defines themes representing the different fields, semantic information, and content types, being related to each other. In the example denoted by A53, names of the content types such as "catalog", "review", "article", and "press release" are defined. For each of these content types, "themes" representing the fields, and "keywords" corresponding to the semantic information are defined. Predetermined numerical values are defined for words included in "themes" and "keywords" as corresponding weightings.

For example, when the content type is "catalog", "computer, . . . " are defined as associated themes, and "0.3" is defined as weighting on the word. Keywords associated with "catalog" are also defined. In this case, "COMPANY" is associated and weighting of "0.6" is defined.

Similarly, in the content type of "review", "restaurant, travel, book, computer" are defined with weighting of "0.2", respectively, as associated themes. "EVENT" and "CITY" are defined as keywords, with weighting of "0.2" and "0.1", respectively.

In the content type of "article", "politics, economics, sports, entertainment, . . . " are defined as associated themes, with weighting of "0.8", respectively. "PERSON" with weighting of "0.3", "COUNTRY" with weighting of "0.1", and "ATHLETE" with weighting of "0.3" are defined as keywords.

In the content type of "press release", "computer, entertainment" are defined as associated themes, with weighting of "0.3", respectively. As keywords, "COMPANY" and "DATE" are defined with weighting of "0.7", respectively, and "PERSON" is defined with weighting of "0.1".

The content-type estimating unit 207 applies the content-type estimation rule 266 to the input-document estimation result and the keyword-meaning estimation result that are obtained in the processes by the previous stage, to determine that "sports" included in the input-document estimation result matches the content type of "article".

Because the weighting allocated to "sports" is defined as "0.8", the content-type estimating unit 207 reads this value, and multiplies the weighting value by the score "10" attached to "sports" in the input-document estimation result. Specifically, for the content type of "article", calculation of 0.8× 10=8.0 is performed.

The content-type estimating unit 207 refers to the keyword-meaning estimation result, and determines that "PERSON" included in the keyword-meaning estimation result matches "PERSON" defined by the weighting value "0.3" in the associated keywords of the content type "article", and matches "PERSON" defined by the weighting value "0.1" in the associated keywords of the content type "press release".

The content-type estimating unit 207 adds these weighting values to the previously-derived result of the multiplication of the weighting value of the content type and the score, respectively, to derive a degree of association with the content type (content association degree). Specifically, the content association degree for the content type "article" is calculated by 8.0+0.3+0.3=8.6, and the content association degree for the content type "press release" is calculated by 0.0+0.1=0.1. The content-type estimating unit 207 obtains sets of the content and the content association degree, as the content-type estimation result, as shown by A54. The content types included in the content-type estimation result are estimated types of contents that might have been browsed by the user of the information communication terminal 10. The content association degree represents the certainty (probability) of the estimation, using numerical values.

Returning to FIG. 4, the search-method candidate-selecting unit 208 performs a search-method candidate-selecting process at step S28. The search-method candidate-selecting process at step S28 is explained below with reference to FIGS. 17 to 21.

Figure 17:
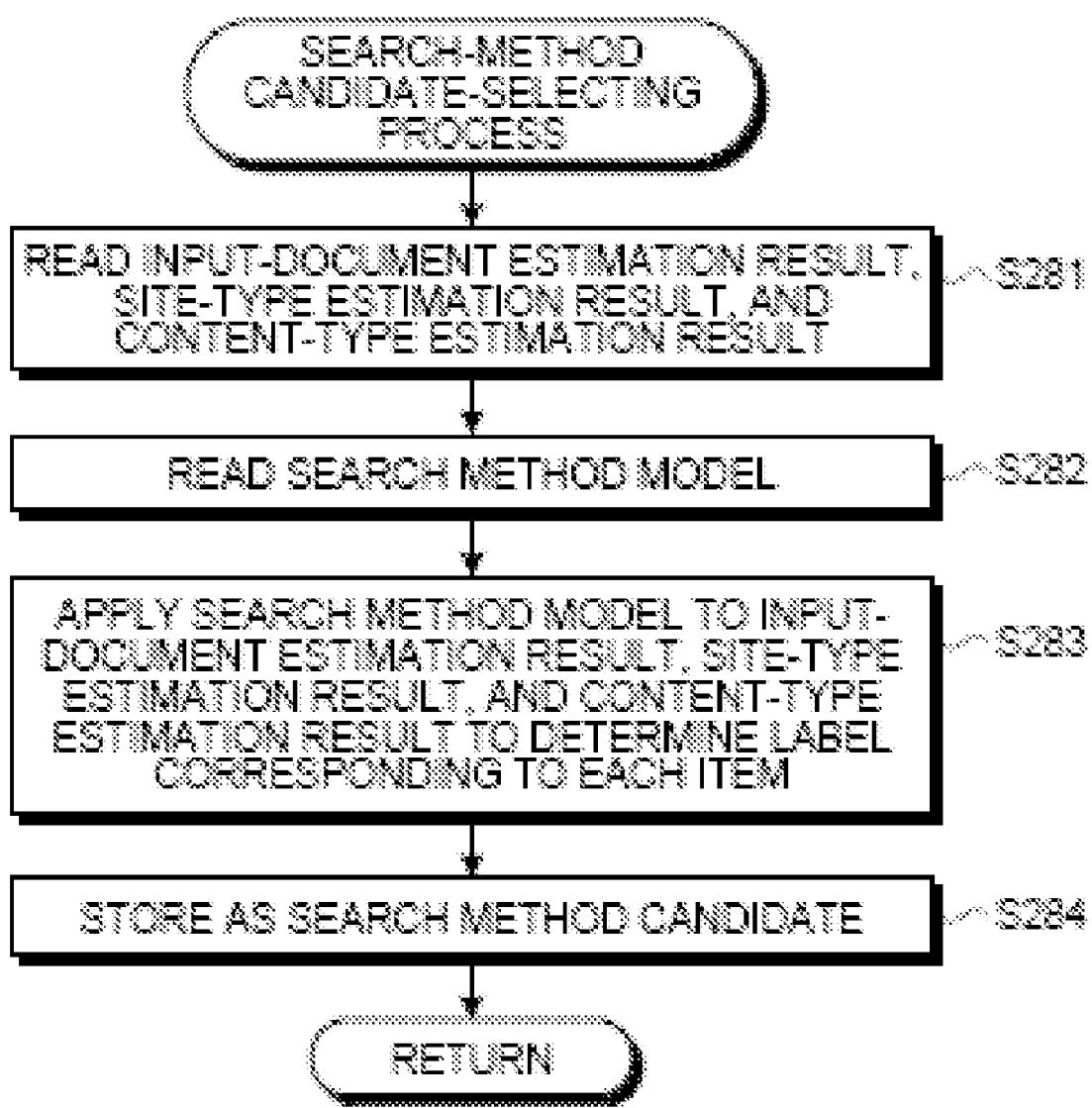
FIG. 17 is a flowchart of a search-method candidate-selecting process.

FIG. 17 is a flowchart of a search-method candidate-selecting process procedure performed by the search-method candidate-selecting unit 208. The search-method candidate-selecting unit 208 reads the input-document estimation result, the site-type estimation result, and the content-type estimation result that are obtained in the processes by the previous stage, from the RAM 25 (step S281).

The search-method candidate-selecting unit 208 reads the search method model 267 previously stored in the storage unit 26 (step S282). The search method model 267 is explained below with reference to FIGS. 18A to 18C.

FIGS. 18A to 18C depict examples of the search method model 267. The search method model 267 defines "themes", "site types", and "content types" as items included in the input-document estimation result, the site-type estimation result, and the content-type estimation result, respectively, and "labels" representing targets for search, being related to each other.

The search method model 267 shown in FIG. 18A defines "labels" for search, related to "themes". For example, in the case of "computer", labels such as "check specs, check times to release, see reputations" are defined. Similarly, in the case of "sports", labels such as "see match results, see profiles" are defined. In the case of "politics", labels such as "see profiles, check meanings, check organizations" are defined. In the case of "travel", labels such as "see maps, check values, search for tours" are defined. An "ID" is an identification (ID) number for uniquely identifying the name of a theme.

The search method model 267 shown in FIG. 18B defines "labels" for search, related to the "site types". For example, in the case of "shopping site", labels such as "check prices, check reputations, check dealers" are defined. Similarly, labels such as "read news, see profiles, see photos" are defined for the "news site". Labels such as "see reputations, see profiles" are defined for the "Blog". Labels such as "search for tours, see maps, check places, see impressions" are defined for the "travel site". An "ID" is an ID number for uniquely identifying the name of a site type.

The search method model 267 shown in FIG. 18C defines "labels" for search, related to the "content types". For example, in the case of "catalog", labels such as "check meanings of terms, check prices" are defined. Similarly, labels such as "check specs, see reputations" are defined for the "review". Labels such as "read news, see profiles, check places" are defined for the "articles". Labels such as "check meanings of terms, check companies, check prices" are defined for the "press release". An "ID" is an ID number for uniquely identifying the name of a content type.

For each of the labels, a search keyword group corresponding to the search target is previously defined as "search queries", being related thereto. FIG. 19 is an example of "search queries" related to the labels.

For example, when the label name is "check prices", a group of words such as "value, price, net selling price, PRICE, bargain price" are defined as search queries joined by "OR" (search conditions). Similarly, when the label name is "see match results", a group of words such as "score, match result, win, margin" are defined. When the label name is "read news", a group of words such as "news, article" are defined. When the label name is "see profiles", a group of words such as "profile, PROFILE, introduction" are defined. When the label name is "see photos", a group of words such as "image, IMAGE, jpg, jpeg" are defined. These groups of words are defined as search queries joined by "OR", respectively.

Returning to FIG. 17, the search-method candidate-selecting unit 208 applies the search method model 267 to respective items in the input-document estimation result, the site-type estimation result, and the content-type estimation results, to determine labels corresponding to the respective items (step S283). The search-method candidate-selecting unit 208 stores the determined labels in the RAM 25 or the like as the search method candidates (step S284). The process then proceeds to step S29 in FIG. 4.

Figures 20, 21:
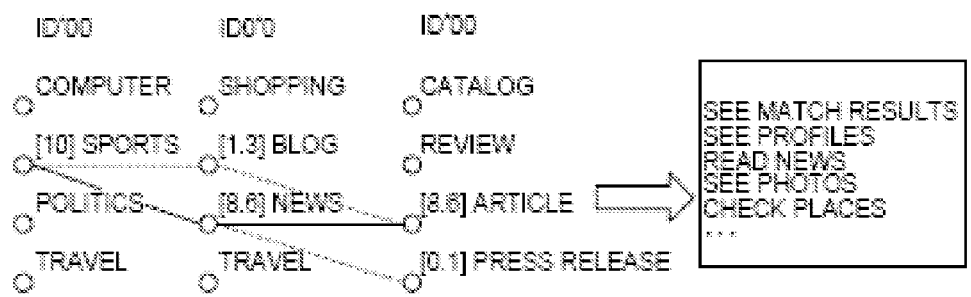
FIG. 20 is a schematic diagram for explaining the content-type estimating process.
FIG. 21 is another schematic diagram for explaining the content-type estimating process.

The process at step S283 is explained with reference to FIGS. 20 and 21. When the search method model 267 as shown in FIGS. 18A to 18C is applied to the input-document estimation result (see A34 in FIG. 12), the site-type estimation result (see A44 in FIG. 14), and the content-type estimation result (see A54 in FIG. 16), the search-method candidate-selecting unit 208 determines that search method models (ID200, ID020, and ID003) shown in FIG. 20 match the respective items (the theme, the site type, and the content type).

The determination on the search method model is performed for example by the following method. The search-method candidate-selecting unit 208 expresses respective contents of the theme, the site type, and the content type as nodes, as shown in FIG. 21, and selects one of the nodes from the three different items, respectively. At this time, nodes corresponding to the theme name, the site type name, and the content type name having the score and the association degree of largest values assigned thereto are selected, respectively. Consequently, the search-method candidate-selecting unit 208 selects nodes of the theme name "sports", the site type name "news", and the content type name "article".

The search-method candidate-selecting unit 208 lists "labels" corresponding to the selected nodes. Accordingly, the search-method candidate-selecting unit 208 obtains "see match results, see profiles, read news, see maps, check places, . . . " as the search method candidates, to be outputted to the search-method candidate-examining unit 209 at the subsequent stage.

Returning to FIG. 4, at step S29, the search-method candidate-examining unit 209 performs a search-method examining process. The operation in the search-method examining process at step S29 is explained below with reference to FIG. 22.

Figure 22:
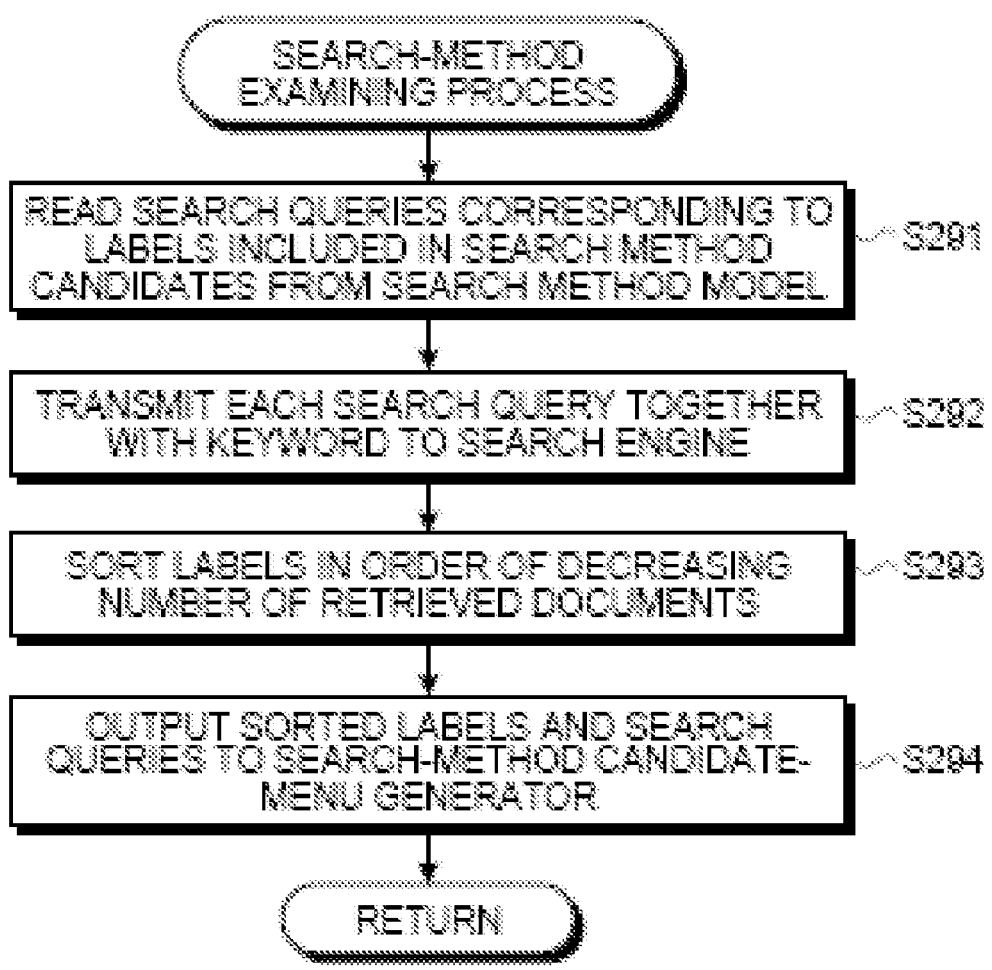
FIG. 22 is a flowchart of a search-method examining process.

FIG. 22 is a flowchart of a search-method examining process procedure performed by the search-method candidate-examining unit 209. The search-method candidate-examining unit 209 refers to the labels included in the search method candidates, and reads "search queries" corresponding to the labels from the search method model 267 stored in the storage unit 26 (step S291).

The search-method candidate-examining unit 209 transmits each of the read "search queries" together with the "keyword" to the search engine 30, to request the search engine 30 to search for documents associated with the "search queries" and the "keyword" (step S292). The "keyword" is the keyword included in the browsing resource, i.e., the keyword designated by the user of the information communication terminal 10. The "search queries" and the "keyword" can be joined by "AND" or "ER".

The search-method candidate-examining unit 209 sorts the labels in order of decreasing number of documents retrieved by the search engine 30 for each of the search queries (step S293), outputs the sorted labels and the search queries being related to each other to the search-method candidate-menu generator 210 at the subsequent stage (step S294). The process then proceeds to step S30 in FIG. 4.

Returning to FIG. 4, the search-method candidate-menu generator 210 generates a menu that enables to display the label names sorted in the search-method examining process, on the display unit 13 of the information communication terminal 10 (step S30). The search-method candidate-menu generator 210 transmits the generated menu together with the "search queries" corresponding to the labels to the information communication terminal 10 (step S31), and terminates the processes in the search support server 20.

All names of the sorted labels can be displayed on the generated "menu", or only labels in high order (for example, top four label names) among the sorted labels can be displayed.

In the information communication terminal 10, when receiving the "menu" and the "search queries" from the search support server 20, the search-method presenting/selecting unit 104 displays a screen indicated by the "menu" (menu screen) on the display unit 13 (step S15). The search-method presenting/selecting unit 104 stands by until a specific label is designated by the user through the operating unit 12 (NO at step S16).

FIG. 23 is an example of the menu screen that is displayed on the display unit 13 at step S15. The user of the information communication terminal 10 can select a specific label from the items (labels) presented on the menu screen, through the operating unit 12. When a specific label (for example, "see match results") is designated by the user through the operating unit 12, an instruction signal corresponding to the label is inputted to the search-method presenting/selecting unit 104.

When the search-method presenting/selecting unit 104 confirms the input of the instruction signal designating the specific label (YES at step S16), the search-query transmitting unit 105 transmits the "search query" corresponding to the designated label and the "keyword" inputted at step S13 to the search engine 30, to request the search engine 30 to search for documents associated with the "search query" and the "keyword" (step S17). The "search query" and the "keyword" can be joined by "AND" or "OR".

When, for example, a label "see match results" is selected based on the menu screen as shown in FIG. 23, the corresponding "search query" is a character string that is obtained by joining "score, match result, win, margin" (see FIG. 19) by "OR". Therefore, the search-query transmitting unit 105 transmits this "search query" to the search engine 30, together with the "keyword" designated by the user (for example, "Tanaka").

When receiving the search result transmitted from the search engine 30, the search-result display unit 106 displays the search result on the display unit 13 (step S18), and terminates the processes in the information communication terminal 10.

FIG. 24 is an example of the search result displayed on the display unit 13 at step S18. The user of the information communication terminal 10 selects a desired web server 40 through the operating unit 12 based on the search result, to browse a content in the web server 40. A keyword can be selected from the browsed content again, to perform the browser-related search process.

As described above, according to the first embodiment, from a document and a specific phrase (keyword) included in the document, the theme of the document, the site type of the web server 40 that provides the document, and the content type of the document are estimated, and search conditions corresponding to the theme, the site type, and the content type are selected. Accordingly, only by designating a specific phrase from a document of concern, the user can benefit from the search conditions corresponding to the theme of the document, the site type of the web server 40 that provides the document, and the content type of the document. Therefore, the burden involved in the searching operation can be reduced, and the user can easily reach desired information.

The programs executed by the search support server 20 in the first embodiment are previously installed in the ROM 24 or the like. However, the programs can be recorded in a computer-readable recording medium such as a compact disk read only memory (CD-ROM), a flexible disk (FD), a compact disk recordable (CD-R), a digital versatile disk (DVD) in a file of an installable or executable format. These programs can be stored in a computer that is connected to a network such as the Internet, and downloaded through the network. The programs can be provided or distributed through a network such as the Internet.

In the first embodiment, the search conditions are selected based on the theme of the document, the site type, and the content type. The search conditions, however, can be selected based on any characteristics among the theme of the document, the site type, and the content type.

A search support apparatus, a computer program product, and a search support system according to a second embodiment of the present invention are explained next. Like or corresponding elements as those in the first embodiment are denoted by like references numerals, and explanations thereof will be omitted.

Figure 25:
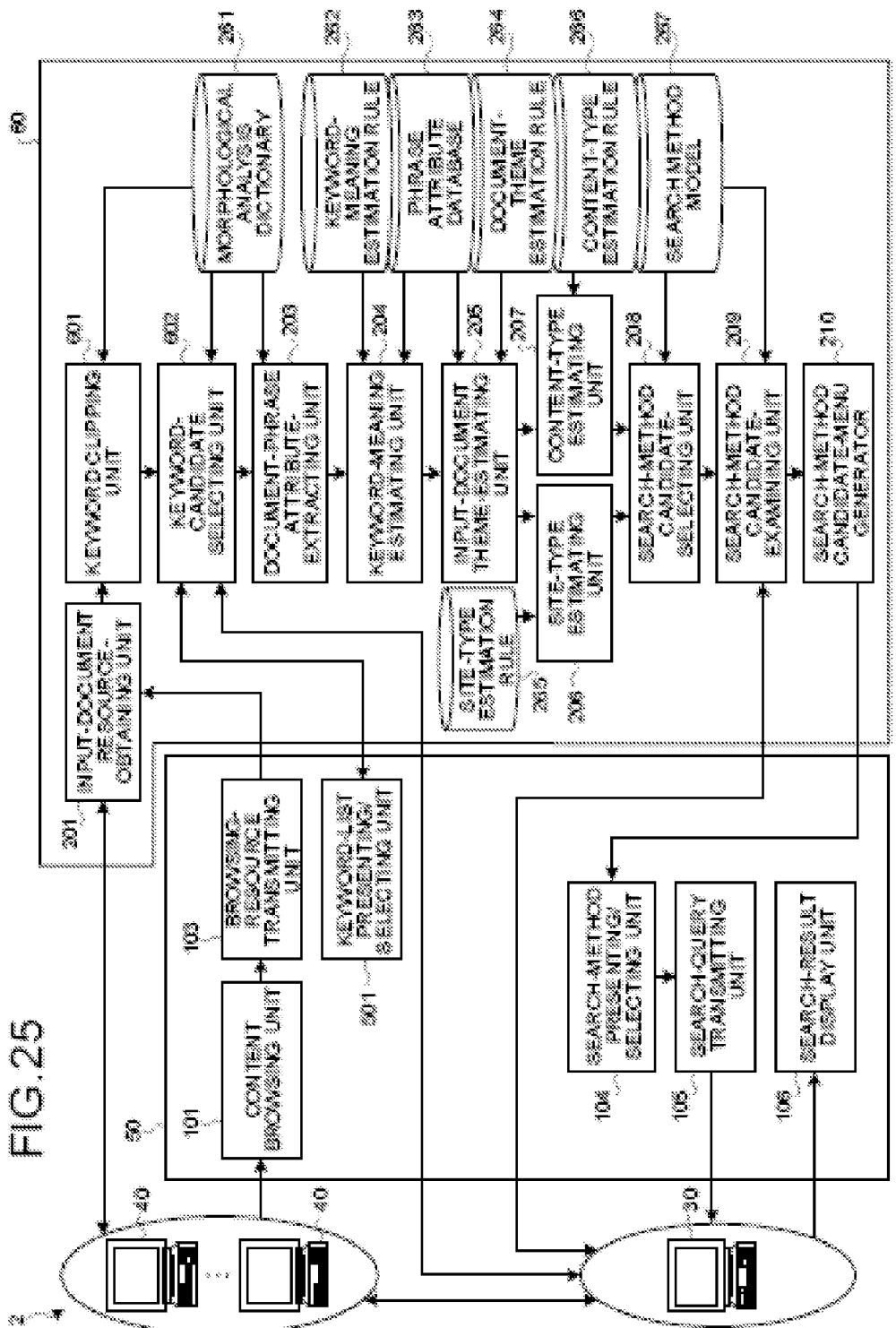
FIG. 25 is a schematic diagram of a configuration of a search support system according to a second embodiment of the present invention.

FIG. 25 is a schematic diagram of a configuration of search support system 2 according to the second embodiment. As shown in FIG. 25, the search support system 2 includes an information communication terminal 50, a search support server 60, the search engine 30, and the web server 40. These components are connected through a network such as the Internet to communicate with each other.

As shown in FIG. 25, the information communication terminal 50 according to the second embodiment is configured by eliminating the keyword designating unit 102 from the functional configuration of the information communication terminal 10 (see FIG. 1) explained in the first embodiment, and newly adding a keyword-list presenting/selecting unit 501. That is, according to the second embodiment, a specific keyword in a content is not transmitted to the search support server 60. Instead, when an instruction signal instructing to perform a browser-related search process is inputted during browsing of a content, a URL of the content that is currently browsed or an HTML document of the content is transmitted to the search support server 60 as a browsing resource.

Figure 26A:
FIGS. 26A to 26C are examples of a screen displayed on a display unit of an information communication terminal.
Figure 26B:
Figure 26C:

A procedure performed until the browsing resource is transmitted from the information communication terminal 50 according to the second embodiment is explained with reference to FIGS. 26A to 26C. In a state that a content is displayed on the display unit 13 as shown in FIG. 26A, when a "related search" instructing to perform the browser-related search process is selected from the "browser menu" (see FIG. 26B), the browsing-resource transmitting unit 103 transmits a URL of the content displayed on the display unit 13 or an HTML document of the content to the search support server 60 as a browsing resource, as shown in FIG. 26C.

The search support server 60 according to the second embodiment is configured by adding a keyword clipping unit 601, and a keyword-candidate selecting unit 602 to the functional configuration of the search support server 20 explained in the first embodiment (see FIG. 1).

The keyword clipping unit 601 regards the HTML document inputted from the input-document resource-obtaining unit 201 as an input document, applies the morphological analysis to the input document, and divides the input document into morphemes, to be stored in the RAM 25 or the like.

The keyword-candidate selecting unit 602 according to the second embodiment extends a selection range for a word class (keyword), for each of the morphemes divided by the keyword clipping unit 601, as in the first embodiment. The keyword-candidate selecting unit 602 selects higher keywords for which more search results are obtained, among search results acquired by transmitting each of character strings obtained as keyword candidates to the search engine 30, and transmits the selected keywords to the information communication terminal 50 as keyword candidates. The number of keywords to be selected is not particularly limited.

When receiving a keyword from the keyword-list presenting/selecting unit 501 in the information communication terminal 50, the keyword-candidate selecting unit 602 performs the keyword-candidate selecting process (see FIG. 6) based on the keyword and the input document. Details of the subsequent processes are the same as those in the first embodiment, and therefore explanations thereof will be omitted.

In the information communication terminal 50, when receiving keyword candidates transmitted from the search support server 60, the keyword-list presenting/selecting unit 501 displays the keyword candidates on the display unit 13 to be presented to the user.

Figure 27A:
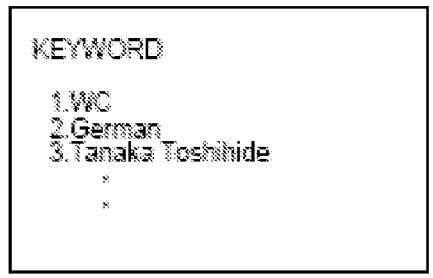
FIGS. 27A and 27B are examples of a screen displayed on the display unit of the information communication terminal.
Figure 27B:
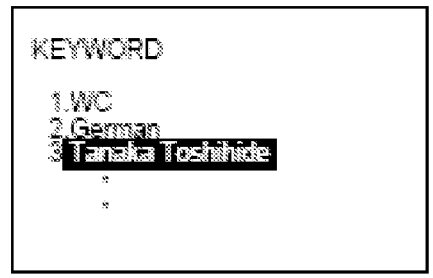

FIG. 27A is an example of the keyword candidates displayed on the display unit 13 by the keyword-list presenting/selecting unit 501. The user of the information communication terminal 50 can selects a specific keyword name from the keyword candidates presented on the display unit 13 through the operating unit 12, as shown in FIG. 27B. When a specific keyword name (for example, "Tanaka Toshihide") is selected, an instruction signal corresponding to the keyword name is inputted to the keyword-list presenting/selecting unit 501.

When confirming the input of the instruction signal instructing the specific keyword name, the keyword-list presenting/selecting unit 501 transmits keywords corresponding to the keyword name instructed by the instruction signal to the keyword-candidate selecting unit 602 in the search support server 60.

According to the second embodiment, only by selecting a specific keyword from plural keyword candidates selected from a document currently browsed, the user can benefit from search conditions corresponding to the theme of the document, the site type of the web server 40 that provide the document, and the content type of the document. Therefore, the burden involved in the searching operation can be reduced, and the user can easily reach desired information.

A search support apparatus, a program, and a search support system according to a third embodiment of the present invention are explained next. Like or corresponding elements as those in the first embodiment are denoted by like reference numerals, and explanations thereof will be omitted.

Figure 28:
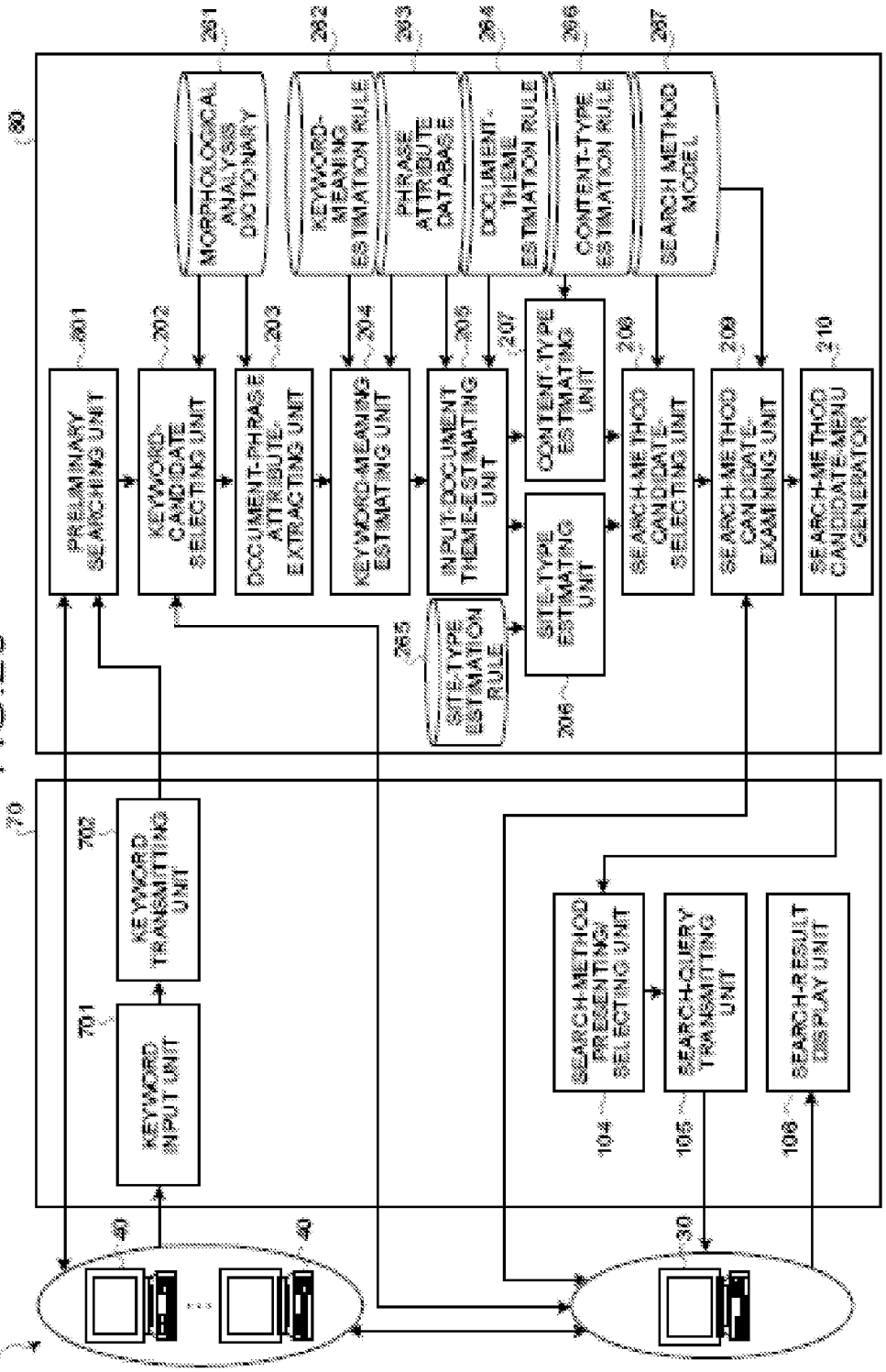
FIG. 28 is a schematic diagram of a configuration of a search support system according to a third embodiment of the present invention.

FIG. 28 is a schematic diagram of a configuration of a search support system 3 according to the third embodiment. As shown in FIG. 28, the search support system 3 includes an information communication terminal 70, a search support server 80, the search engine 30, and the web server 40. These components are connected through a network such as the Internet to communicate each other.

As shown in FIG. 28, the information communication terminal 70 according to the third embodiment is configured by eliminating the content browsing unit 101, the keyword designating unit 102, and the browsing-resource transmitting unit 103 from the functional configuration of the information communication terminal 10 explained in the first embodiment (see FIG. 1), and newly adding a keyword input unit 701 and a keyword transmitting unit 702.

Figure 29:
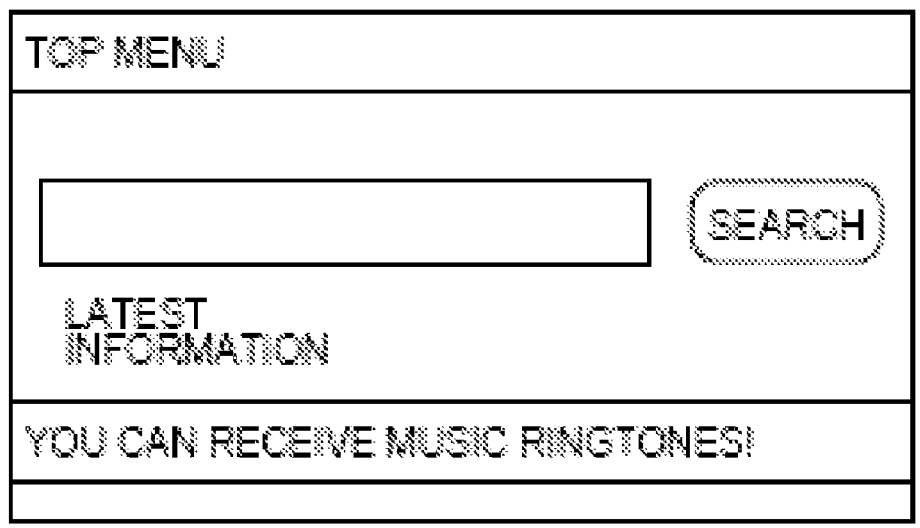
FIG. 29 is an example of a screen displayed on a display unit of an information communication terminal.

The keyword input unit 701 provides a user of the information communication terminal 70 with an input support screen that enables to directly input a keyword as a target for the related search through the operating unit 12. The input support screen is an interface that is displayed on the display unit 13 as shown in FIG. 29, for example. The user can input a keyword as a target for the related search through the input support screen. The keyword input unit 701 outputs the keyword inputted through the input support screen to the keyword transmitting unit 702.

The keyword transmitting unit 702 transmits the keyword inputted by the keyword input unit 701 to the search support server 80.

The search support server 80 according to the third embodiment is configured by eliminating the input-document resource-obtaining unit 201 from the functional configuration of the search support server 20 explained in the first embodiment (see FIG. 1), and newly adding a preliminary searching unit 801.

The preliminary searching unit 801 transmits the keyword transmitted from the keyword transmitting unit 702 in the information communication terminal 70 to the search engine 30, to request search for documents associated with the keyword. The preliminary searching unit 801 obtains a predetermined number of HTML documents corresponding to contents that are obtained from the search engine 30 as search results associated with the keyword, from higher web servers (websites), and outputs the obtained HTML documents and the keyword transmitted from the information communication terminal 70 to the keyword-candidate selecting unit 202. Details of the following processes are the same as those in the first embodiment, and therefore explanations thereof will be omitted. The number of HTML documents to be obtained can be arbitrarily set.

According to the third embodiment, only by inputting a keyword as a target for the related search, the user of the information communication terminal 70 can benefit from search conditions corresponding to the theme of a document associated with the keyword, the site type of the web server 40 that provides the document, and the content type of the document. Therefore, the burden involved in the searching operation can be reduced, and the user can easily reach desired information.

While the first to third embodiments of the present invention have been explained above, the present invention is not limited thereto, and various modifications, substitutions, or additions can be made without departing from the scope of the invention.

Programs that are executed by the information communication terminals and search support servers according to the first to third embodiments are previously installed in the ROM or the storage unit that is built into the respective devices and provided. However, these programs can be provided being recorded in a computer-readable recording medium such as a CD-ROM, a FD, a CD-R, and a DVD in a file of an installable or executable format. These programs can be stored in a computer that is connected to a network such as the Internet, and downloaded through the network. These programs can be provided or distributed through a network such as the Internet.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A search support apparatus comprising:
a document obtaining unit that obtains a document and a keyword that is a specific character string designated in the document;
a statistical-information generating unit that extracts morphemes having a specific attribute among morphemes included in the document, and generates statistical information associated with statuses of appearance of the extracted morphemes in the document;
a first storage unit that stores a morpheme attribute table relating morphemes to attributes of the morphemes;
an attribute determining unit that determines attributes of the morphemes included in the document, based on the morpheme attribute table;
a keyword-candidate obtaining unit that extends a range of a character string corresponding to the keyword in units of morphemes, based on morphemes in the document appearing before and after the keyword, to obtain keyword candidates;
a keyword-information generating unit that generates keyword information relating each of the morphemes included in at least one of keywords and the keyword candidates to an attribute of each morpheme;
a second storage unit that stores a theme table relating themes representing fields to terms associated with the themes;
a third storage unit that stores a first search condition table relating the themes representing the fields to search conditions associated with the themes;
a theme estimating unit that estimates a theme of the document from the morphemes included in the statistical information and the keyword information, based on the theme table;
a fourth storage unit that stores a meaning table relating predetermined character strings to affairs meant by the character strings;
an affair determining unit that determines an affair meant by character strings included in the document, based on the meaning table;
a fifth storage unit that stores a site-type table relating site types of websites to the themes and affairs associated with the site types;
a sixth storage unit that stores a second search condition table relating the site types of the websites to search conditions associated with the site types;
a site-type estimating unit that estimates a site type of a website that provides the document, from the theme of the document and the affair meant by the character strings in the document, based on the site-type table; and
a search-condition selecting unit that selects a search condition associated with the theme of the document estimated by the theme estimating unit, from the first search condition table and that selects a search condition associated with the site type estimated by the site-type estimating unit, from the second search condition table.

2. The apparatus according to claim 1, further comprising:
a seventh storage unit that stores a content-type table relating content types indicating types of contents, to the themes and affairs associated with the content types;
an eighth storage unit that stores a third search condition table relating the content types to search conditions associated with the content types; and
a content-type estimating unit that estimates a content type of the document, from the theme of the document and the affair meant by the character strings in the document, based on the content-type table, wherein
the search-condition selecting unit selects a search condition associated with the estimated content type, from the third search condition table.

3. The apparatus according to claim 1, further comprising:
a search request unit that requests an external search engine to search for documents associated with each of the keyword candidates; and
a keyword-candidate selecting unit that selects keyword candidates with which more than a predetermined number of documents are retrieved, among the keyword candidates, based on search results of the search engine, wherein
the keyword-information generating unit generates the keyword information based on the selected keyword candidates.

4. The apparatus according to claim 1, further comprising a presenting unit that presents the search condition selected by the search-condition selecting unit.

5. The apparatus according to claim 4, further comprising:
a search request unit that request an external search engine to search for documents matching the search condition selected by the search-condition selecting unit, wherein
the presenting unit presents the selected search condition in an order according to the number of retrieved documents, based on the search result of the search engine.

6. The apparatus according to claim 1, further comprising:
a phrase clipping unit that clips phrases included in the document in units of morphemes; and
a phrase designating unit that can designate a specific phrase among the phrases in units of morphemes, wherein
the document obtaining unit obtains the phrase designated by the phrase designating unit as the keyword.

7. The apparatus according to claim 1, further comprising:
an input unit that receives an input of the keyword; and
a search request unit that request an external search engine to search for documents associated with the keyword received by the input unit, wherein
the document obtaining unit obtains the documents retrieved by the search engine.

8. A computer program product having a computer-readable medium including programmed instructions for supporting a search, wherein the instructions, when executed by a computer, cause the computer to perform:
obtaining a document and a keyword that is a specific character string designated in the document;
extracting morphemes having a specific attribute among morphemes included in the document, and generating statistical information associated with statuses of appearance of the extracted morphemes in the document;
determining attributes of the morphemes included in the document, based on a morpheme attribute table relating morphemes to attributes of the morphemes;
extending a range of a character string corresponding to the keyword in units of morphemes, based on morphemes in the document appearing before and after the keyword, to obtain keyword candidates;
generating keyword information relating each of the morphemes included in at least one of the keywords and the keyword candidates to an attribute of each morpheme;
estimating a theme of the document from the morphemes included in the statistical information and the keyword information, based on a theme table relating themes representing fields to terms associated with the themes;
determining an affair meant by character strings included in the document based on a meaning table relating predetermined character strings to affairs meant by the character strings;
estimating a site type of a website that provides the document, from the theme of the document and the affair meant by the character strings in the document, based on the site-type table relating site types of websites to the themes and affairs associated with the site types; and
selecting a search condition associated with the estimated theme of the document, from a first search condition table relating the themes representing the fields to search conditions associated with the themes and selecting a search condition associated with the estimated site type, from a second search condition table relating the site types of the websites to search conditions associated with the site types.

9. A search support system in which an information communication terminal and a search support apparatus are connected to communicate each other, wherein
the information communication terminal comprises:
a content browsing unit that obtains a document provided by an external device;
a keyword designating unit that can designate a specific character string in the document as a keyword;
a browsing-resource transmitting unit that transmits the document and the keyword to the search support apparatus; and
a display unit, and
the search support apparatus comprises:
a document obtaining unit that obtains the document and the keyword;
a statistical-information generating unit that extracts morphemes having a specific attribute among morphemes included in the document, and generates statistical information associated with statuses of appearance of the extracted morphemes in the document;
a first storage unit that stores a morpheme attribute table relating morphemes to attributes of the morphemes;
an attribute determining unit that determines attributes of the morphemes included in the document, based on the morpheme attribute table;
a keyword-candidate obtaining unit that extends a range of a character string corresponding to the keyword in units of morphemes, based on morphemes in the document appearing before and after the keyword, to obtain keyword candidates;
a keyword-information generating unit that generates keyword information relating each of the morphemes included in at least one of the keywords and the keyword candidates to an attribute of each morpheme;
a second storage unit that stores a theme table relating themes representing fields to terms associated with the themes;

a third storage unit that stores a first search condition table relating the themes representing the fields to search conditions associated with the themes;

a theme estimating unit that estimates a theme of the document from the morphemes included in the statistical information and the keyword information, based on the theme table;

a fourth storage unit that stores a meaning table relating predetermined character strings to affairs meant by the character strings;

an affair determining unit that determines an affair meant by character strings included in the document, based on the meaning table;

a fifth storage unit that stores a site-type table relating site types of websites to the themes and affairs associated with the site types;

a sixth storage unit that stores a second search condition table relating the site types of the websites to search conditions associated with the site types;

a site-type estimating unit that estimates a site type of a website that provides the document, from the theme of the document and the affair meant by the character strings in the document, based on the site-type table; and a search-condition selecting unit that selects a search condition associated with the theme of the document estimated by the theme estimating unit, from the first search condition table and that selects a search condition associated with the site type estimated by the site-type estimating unit, from the second search condition table.

* * * * *